US011873050B2

(12) United States Patent
Sato et al.

(10) Patent No.: US 11,873,050 B2
(45) Date of Patent: Jan. 16, 2024

(54) SADDLE RIDING-TYPE VEHICLE

(71) Applicant: HONDA MOTOR CO., LTD., Tokyo (JP)

(72) Inventors: Takashi Sato, Tokyo (JP); Yutaka Aikyo, Tokyo (JP); Ryota Ishigaki, Yokohama (JP); Masaru Habu, Yokohama (JP); Makoto Fuma, Yokohama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/914,040

(22) PCT Filed: Mar. 31, 2020

(86) PCT No.: PCT/JP2020/014968
§ 371 (c)(1),
(2) Date: Sep. 23, 2022

(87) PCT Pub. No.: WO2021/199364
PCT Pub. Date: Oct. 7, 2021

(65) Prior Publication Data
US 2023/0150599 A1    May 18, 2023

(51) Int. Cl.
*B60R 21/20*     (2011.01)
*B62J 27/20*     (2020.01)
*B60R 21/261*    (2011.01)

(52) U.S. Cl.
CPC ............. *B62J 27/20* (2020.02); *B60R 21/20* (2013.01); *B60R 21/261* (2013.01)

(58) Field of Classification Search
CPC .......... B62J 27/20; B60R 21/16; B60R 21/20; B60R 21/261
See application file for complete search history.

(56) References Cited

U.S. PATENT DOCUMENTS

| | | | |
|---|---|---|---|
| 2005/0062262 A1* | 3/2005 | Williams | ................ B60R 21/26 280/728.2 |
| 2008/0284140 A1* | 11/2008 | Choi | ..................... B60R 21/237 280/728.2 |
| 2018/0208144 A1* | 7/2018 | Sato | ......................... B62J 27/20 |

FOREIGN PATENT DOCUMENTS

| EP | 1338479 A1 * | 8/2003 | ............. B60R 21/16 |
|---|---|---|---|
| JP | H08-318803 | 12/1996 | |

(Continued)

OTHER PUBLICATIONS

Bito, Air Bag Device, Aug. 14, 2002, EPO, JP 2002225664 A, Machine Translation of Description (Year: 2002).*

(Continued)

*Primary Examiner* — Paul N Dickson
*Assistant Examiner* — Matthew D Lee
(74) *Attorney, Agent, or Firm* — Rankin, Hill & Clark LLP

(57) ABSTRACT

A saddle riding-type vehicle includes a retainer that is provided behind a head pipe; an inflator; and an airbag that is housed in the retainer, inflates by gas discharged by the inflator, and is deployed in front of an occupant. The airbag includes a proximal end portion that is positioned in the retainer when the airbag is deployed and an outward deployment portion that extends from the proximal end portion and is deployed to the outside of the retainer when the airbag is deployed. A tab is provided on the proximal end portion, and the tab is fixed to the retainer.

8 Claims, 13 Drawing Sheets

(56) References Cited

FOREIGN PATENT DOCUMENTS

| | | | | |
|---|---|---|---|---|
| JP | 2002225664 A | * | 8/2002 | |
| JP | 2003237661 A | * | 8/2003 | ............ B60R 21/16 |
| JP | 2004-322713 | | 11/2004 | |
| JP | 2015-145152 | | 8/2015 | |
| JP | 6454364 | | 1/2019 | |
| WO | WO-2018221180 A1 | * | 12/2018 | ............ B62J 27/20 |
| WO | WO-2020100239 A1 | * | 5/2020 | ............ B62J 27/20 |

OTHER PUBLICATIONS

Aikyo, Airbag Device for Saddle-Type Vehicle, Dec. 6, 2018, EPO, WO 2018221180 A1, Machine Translation of Description (Year: 2018).*
International Search Report, International Application No. PCT/JP2020/014968, dated Jun. 23, 2020, 2 pages.
Written Opinion of the International Searching Authority dated Jun. 23, 2020 filed in PCT/JP2020/014968, 5 pages.
English translation of the International Preliminary Report on Patentability dated Oct. 13, 2022 issued in corresponding International application No. PCT/JP2020/014968 (6 pages).

* cited by examiner

SADDLE RIDING-TYPE VEHICLE

TECHNICAL FIELD

The present invention relates to a saddle riding-type vehicle.

BACKGROUND ART

Conventionally, a saddle riding-type vehicle including an airbag module has been known (see, for example, Patent Literature 1). In Patent Literature 1, the airbag module is supported by a main frame extending rearward and downward from a head pipe via a stay, and is disposed behind the head pipe.

CITATION LIST

Patent Literature

Patent Literature 1: JP 6454364 B2

SUMMARY OF INVENTION

Technical Problem

When an inflator is disposed on a side of the head pipe and the airbag module is disposed closer to the head pipe, the airbag module can be compactly disposed in a front-rear direction. However, since the inflator is disposed on the side of the head pipe, the airbag may be deployed in such a way as to be inclined in a left-right direction.

The present invention has been made in view of the above circumstances, and an object of the present invention is to provide a saddle riding-type vehicle capable of deploying an airbag while suppressing the airbag from being inclined in the left-right direction.

Solution to Problem

A saddle riding-type vehicle includes: a retainer (41) that is provided behind a head pipe (15); an inflator (43); and an airbag (42) that is housed in the retainer (41), inflates by gas (G) discharged by the inflator (43), and is deployed in front of an occupant, in which the airbag (42) includes a proximal end portion (121) that is positioned in the retainer (41) when the airbag (42) is deployed and an outward deployment portion (122) that extends from the proximal end portion (121) and is deployed to an outside of the retainer (41) when the airbag (42) is deployed, a tab (161) is provided on the proximal end portion (121), and the tab (161) is fixed to the retainer (41).

In the above configuration, an opening (66a) into which the tab (161) is inserted may be formed in a side surface (66) of the retainer (41), and the tab (161) may be fixed to an outer side of the retainer (41) through the opening (66a).

In the above configuration, the proximal end portion (121) may include a bag left-right extending portion (121A) connected to the inflator (43) and a bag upward extending portion (121B) extending upward from the bag left-right extending portion (121A), and the tab (161) may be provided on a side opposite from the inflator (43) in a longitudinal direction (X1) of the bag left-right extending portion (121A).

In the above configuration, the tab (161) may be provided below a line (L2) passing through a center of the inflator (43) and extending along the bag left-right extending portion (121A) in a front view.

In the above configuration, a loop diffuser (141) that guides the gas (G) may be provided in the inflator (43), and the loop diffuser (141) may be disposed in a gas flow path of the proximal end portion (121).

Advantageous Effects of Invention

A saddle riding-type vehicle includes: a retainer that is provided behind a head pipe; an inflator; and an airbag that is housed in the retainer, inflates by gas discharged by the inflator, and is deployed in front of an occupant, in which when the airbag is deployed, the airbag includes a proximal end portion that is positioned in the retainer and an outward deployment portion that extends from the proximal end portion and is deployed to the outside of the retainer, a tab is provided on the proximal end portion, and the tab is fixed to the retainer. With this configuration, it is possible to deploy the airbag while suppressing the airbag from being inclined in the left-right direction.

In the above configuration, an opening into which the tab is inserted may be formed in a side surface of the retainer, and the tab may be fixed to an outer side of the retainer through the opening. With this configuration, the fixing portion of the tab can be made hardly affected by the gas injected from the inflator.

In the above configuration, the proximal end portion may include a bag left-right extending portion connected to the inflator and a bag upward extending portion extending upward from the bag left-right extending portion, and the tab may be provided on a side opposite from the inflator in a longitudinal direction of the bag left-right extending portion. With this configuration, it is possible to fix a portion of the airbag that is hardly affected by the gas injected from the inflator, and it is possible to suppress the airbag from being inclined to in the left-right direction.

In the above configuration, the tab may be provided below a line passing through a center of the inflator and extending along the bag left-right extending portion in the front view. With this configuration, since the fixing tab is positioned below a line passing through the center of the inflator, the airbag can be fixed at a base side together with a connecting portion with the inflator, and it is possible to deploy the airbag deployed while suppressing the airbag from being inclined in the left-right direction.

In the above configuration, a loop diffuser that guides the gas may be provided in the inflator, and the loop diffuser may be disposed in a gas flow path of the proximal end portion. With this configuration, it is possible to reinforce the proximal end portion, and it is possible to deploy the airbag while stabilizing the posture of the proximal end portion.

DESCRIPTION OF EMBODIMENTS

Figure 1:
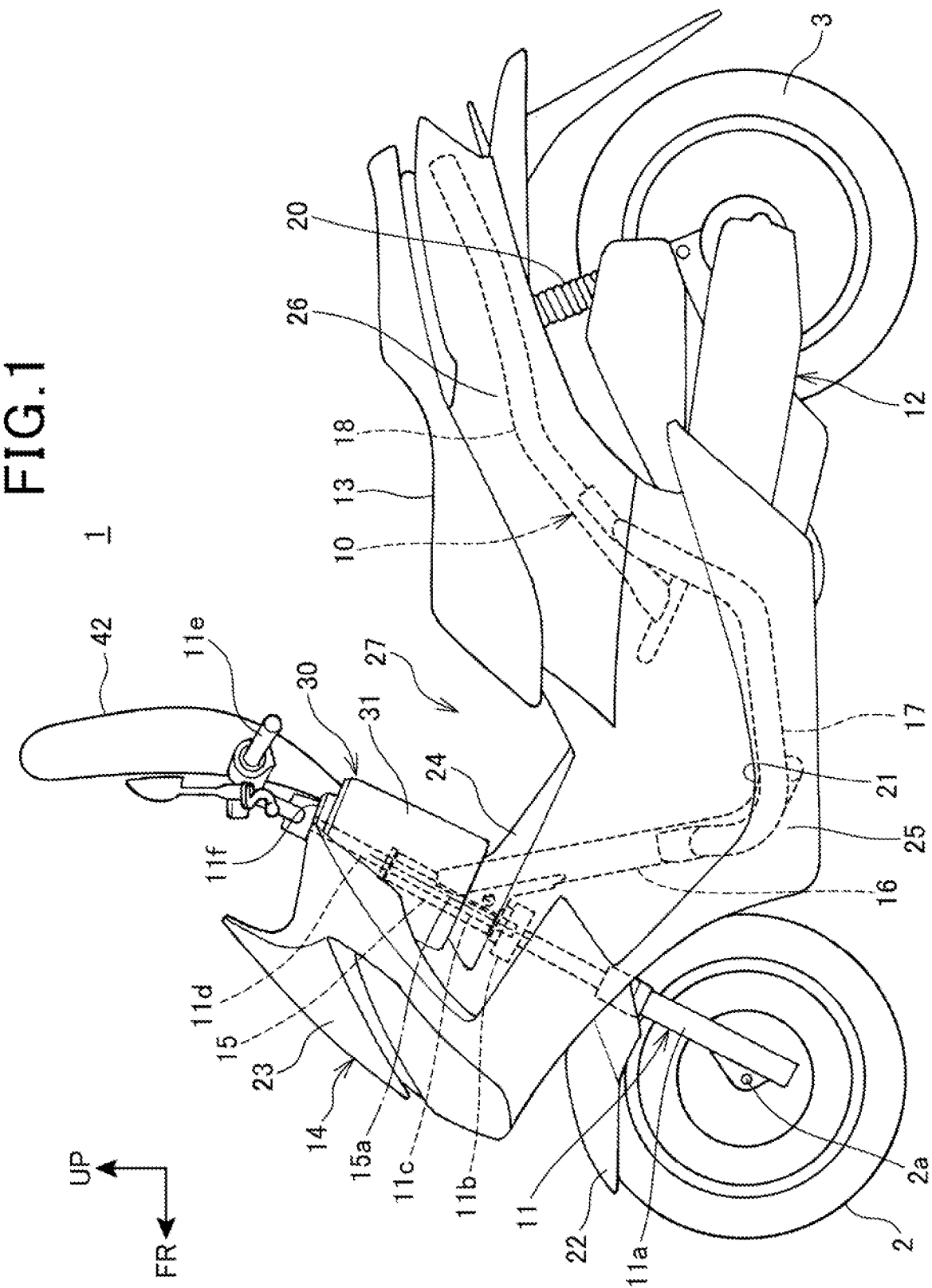
FIG. 1 is a left side view of a motorcycle according to an embodiment of the present invention.

An embodiment of the present invention will be described below with reference to the drawings. Note that, in the description, directions such as a front-rear direction, a left-right direction, and a vertical direction are the same as directions with respect to a vehicle body unless otherwise specified. In the drawings, Reference Sign FR denotes the front side of the vehicle body, Reference Sign UP denotes the upper side of the vehicle body, and Reference Sign LH denotes the left side of the vehicle body.

FIG. 1 is a left side view of a motorcycle 1 according to the embodiment of the present invention.

The motorcycle 1 is a scooter type saddle riding-type vehicle including a vehicle body frame 10, a steering system 11 that steerably supports a front wheel 2, a power unit 12 supported by a rear portion of the vehicle body frame 10, a rear wheel 3, and a seat 13 on which an occupant sits astride the seat.

Further, the motorcycle 1 includes a vehicle body cover 14 that covers a vehicle body such as the vehicle body frame 10.

Figure 2:
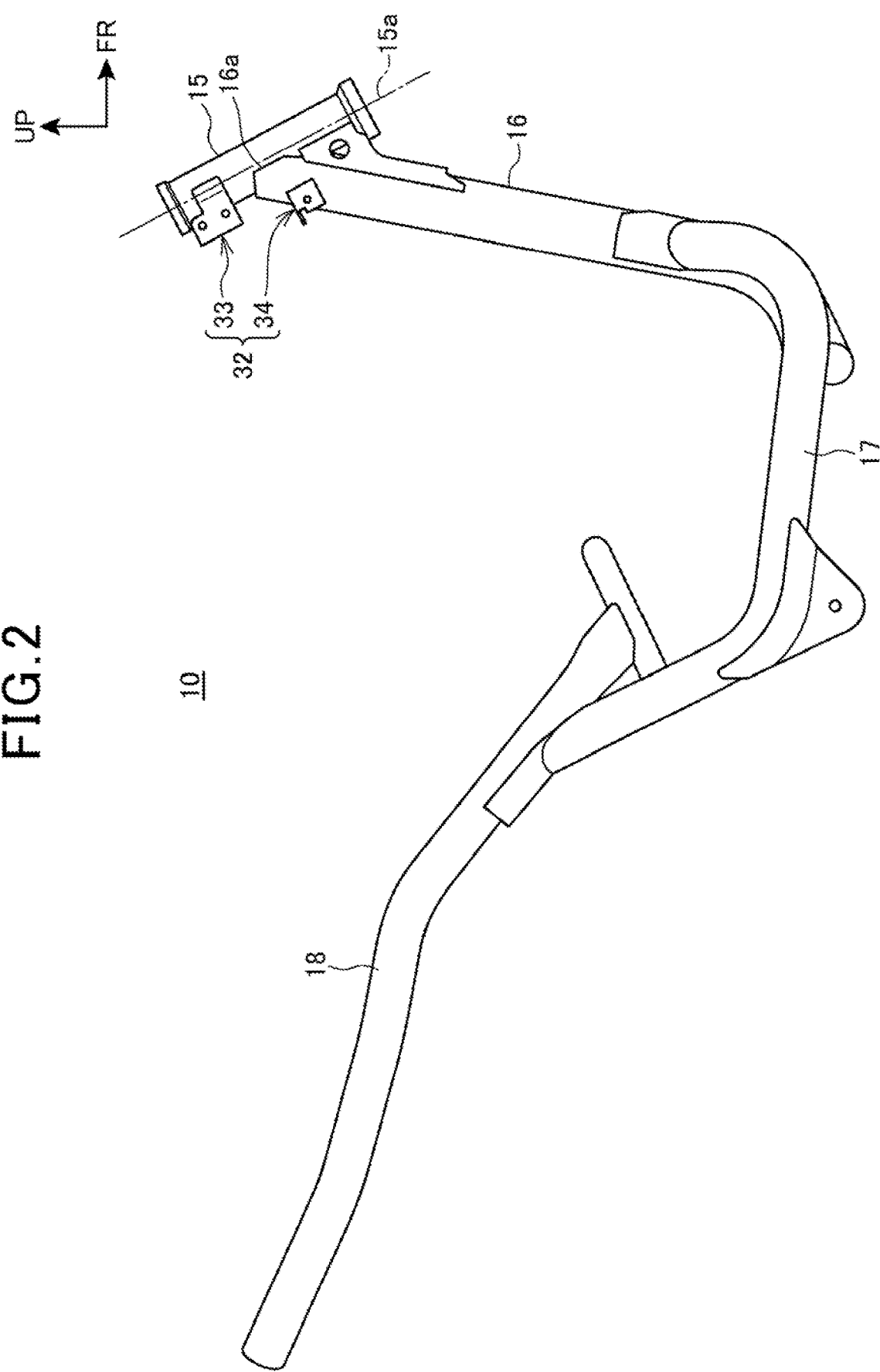
FIG. 2 is a right side view of a vehicle body frame.

FIG. 2 is a right side view of the vehicle body frame 10.

Referring to FIGS. 1 and 2, the vehicle body frame 10 includes a head pipe 15 provided at a front end portion of the vehicle body frame 10, a down frame 16 extending rearward and downward from a rear side of the head pipe 15, a pair of left and right lower frames 17 extending rearward from a lower end portion of the down frame 16, and a pair of left and right seat frames 18 extending rearward and upward from rear end portions of the lower frames 17.

The head pipe 15 and the down frame 16 are positioned at the center of a vehicle width similarly to the front wheel 2.

The power unit 12 is a unit swing engine including an engine as a drive source of the rear wheel 3 and a swingarm supporting the rear wheel 3 in a swingable manner, the engine and the swingarm being integrated with each other. The power unit 12 is supported by the vehicle body frame 10 in a swingable manner via a link mechanism (not illustrated) provided at a front portion of the power unit 12.

A rear suspension 20 is stretched between a rear portion of the seat frame 18 and a rear end portion of the power unit 12.

A storage box (not illustrated) supported by the seat frame 18 is disposed below the seat 13. The seat 13 is supported by the seat frame 18 via the storage box.

A pair of left and right step floors 21 having a plate shape and on which feet of the occupant sat on the seat 13 are placed are provided in front of and below the seat 13, and cover the lower frame 17 from above.

The steering system 11 includes a pair of front forks 11a disposed on the left and right sides of the front wheel 2, a bridge member 11b connecting upper end portions of the left and right front forks 11a in a vehicle width direction, a steering shaft 11c extending upward from the center of the bridge member 11b and rotatably supported by the head pipe 15, a handlebar post 11d fixed to an upper end portion of the steering shaft 11c, and a steering handlebar 11e fixed to an upper end of the handlebar post 11d.

An axis 15a of the head pipe 15 is inclined rearward with respect to a vertical direction in a vehicle side view. An axis of rotation of the steering shaft 11c coincides with the axis 15a. The handlebar post 11d obliquely extends rearwards and upwards from the head pipe 15 side along the axis 15a.

The front wheel 2 is supported by an axle 2a connecting lower end portions of the front forks 11a in a left-right direction.

A front fender 22 that covers the front wheel 2 from above is fixed to the front forks 11a.

Figure 3:
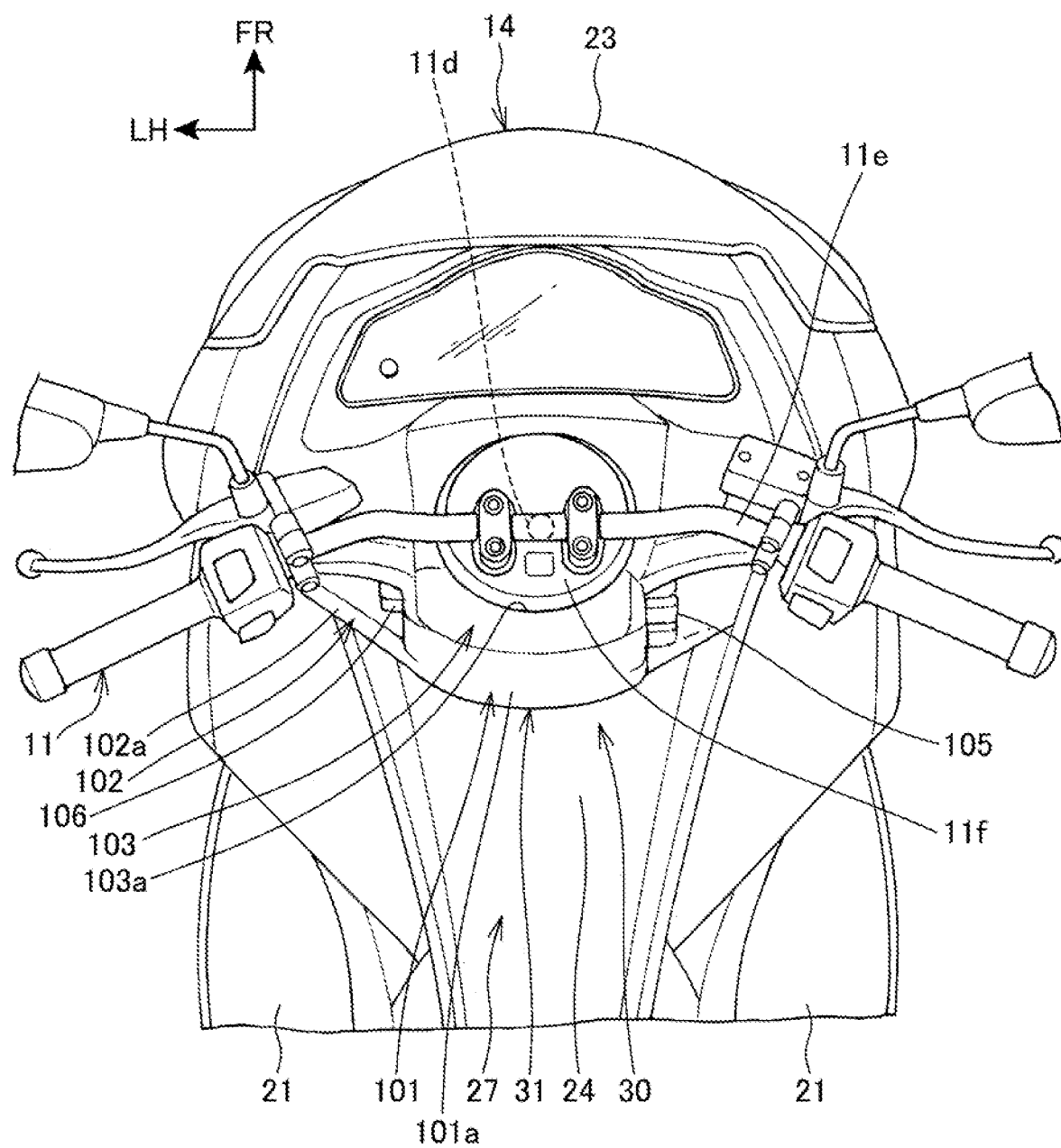
FIG. 3 is a view of a front portion of the motorcycle as viewed from above on an occupant side.

FIG. 3 is a view of a front portion of the motorcycle 1 as viewed from above on an occupant side.

Referring to FIGS. 1 and 3, the vehicle body cover 14 includes a front cover 23 that covers the steering system 11 and the head pipe 15 from the front side, an inner cover 24 that covers the steering system 11 and the head pipe 15 from the rear side, a lower cover 25 that covers the lower frame 17 from the outer side below the step floors 21, and a side cover 26 that covers the seat frame 18 from the outer side below the seat 13.

In the vehicle side view, a straddling space 27 recessed downward when viewed from the side of the vehicle is defined between the inner cover 24 and a front end portion of the seat 13. When getting on and off the motorcycle 1, the occupant can straddle the motorcycle 1 through the straddling space 27.

Referring to FIGS. 1 and 3, the motorcycle 1 includes an airbag device 30 that reduces an impact on the occupant.

The airbag device 30 includes an airbag unit 31, an acceleration sensor (not illustrated) that detects an impact on the motorcycle 1, and an airbag control device (not illustrated) that controls the operation of the airbag unit 31 based on a detection result of the acceleration sensor.

The airbag unit 31 is disposed on the rear side of the inner cover 24 and is positioned in front of the occupant sat on the seat 13. The airbag unit 31 is provided behind the head pipe 15 and below the handlebar 11e, and is positioned at a front side of the straddling space 27.

A rear portion of the airbag unit 31 is exposed from a notch portion provided in a central portion of the inner cover 24 to the straddling space 27 positioned on the outside of the vehicle body cover 14.

Figure 4:
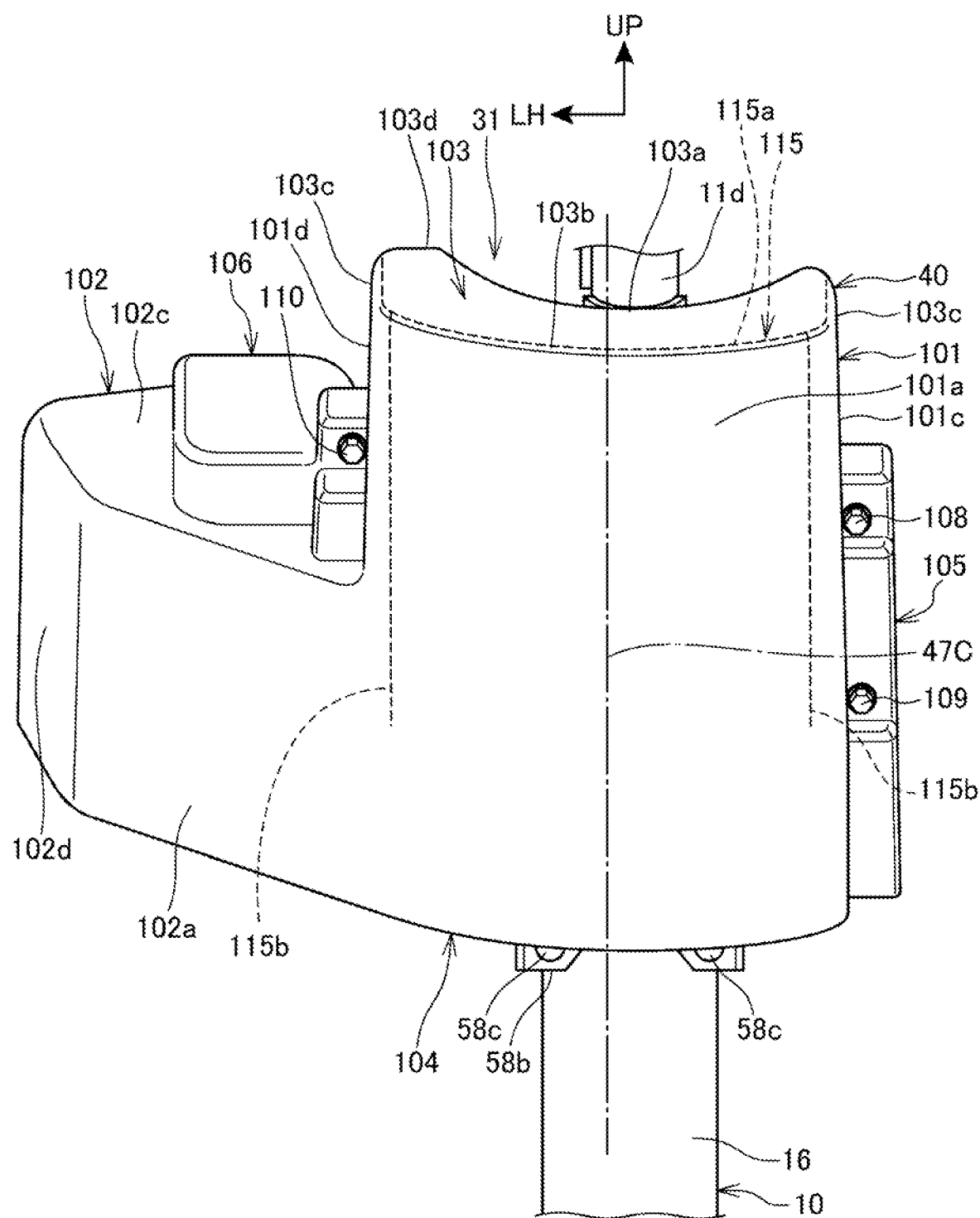
FIG. 4 is a view of an airbag unit attached to the vehicle body frame as viewed from a rear side.
Figure 5:
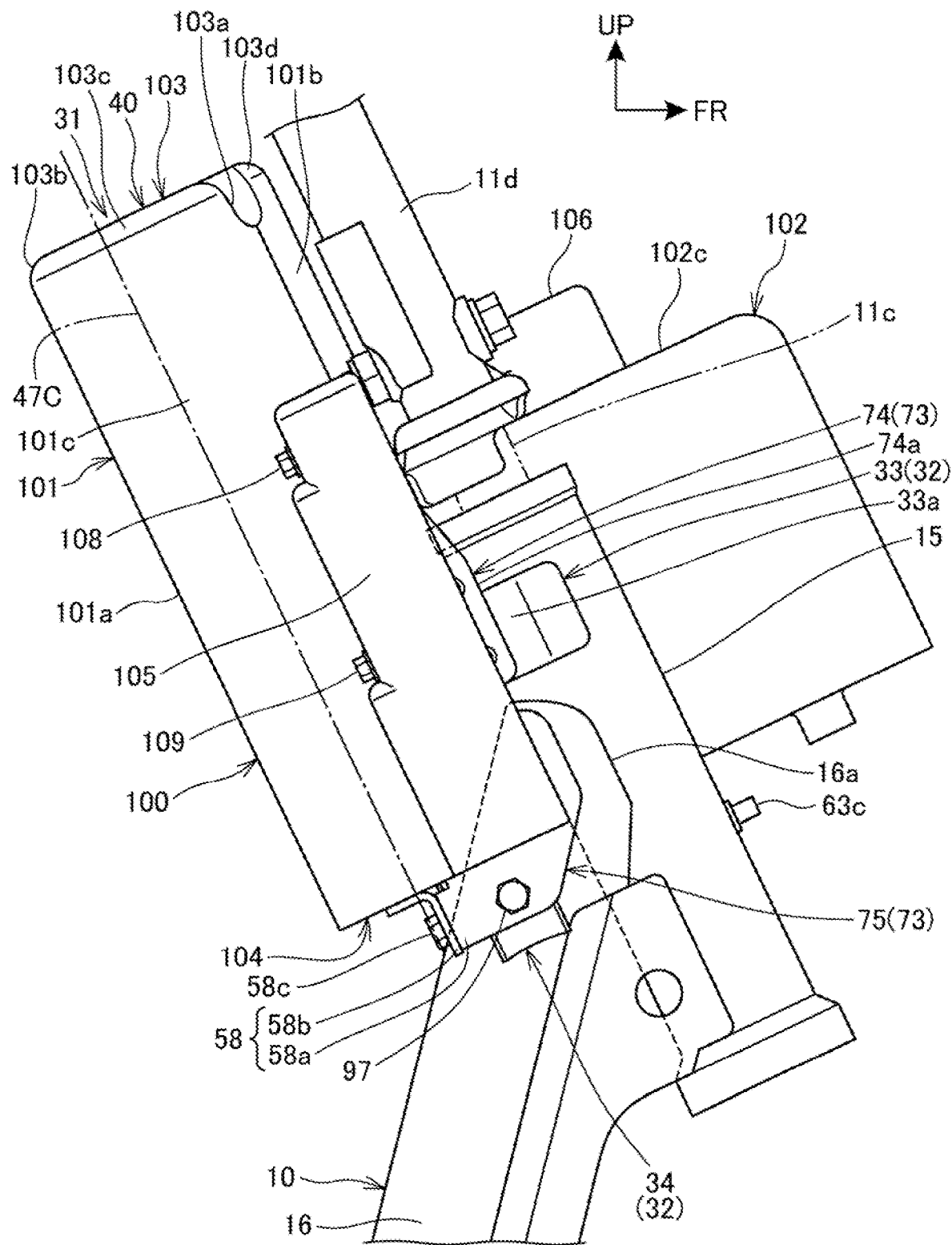
FIG. 5 is a right side view of the airbag unit attached to the vehicle body frame.
Figure 6:
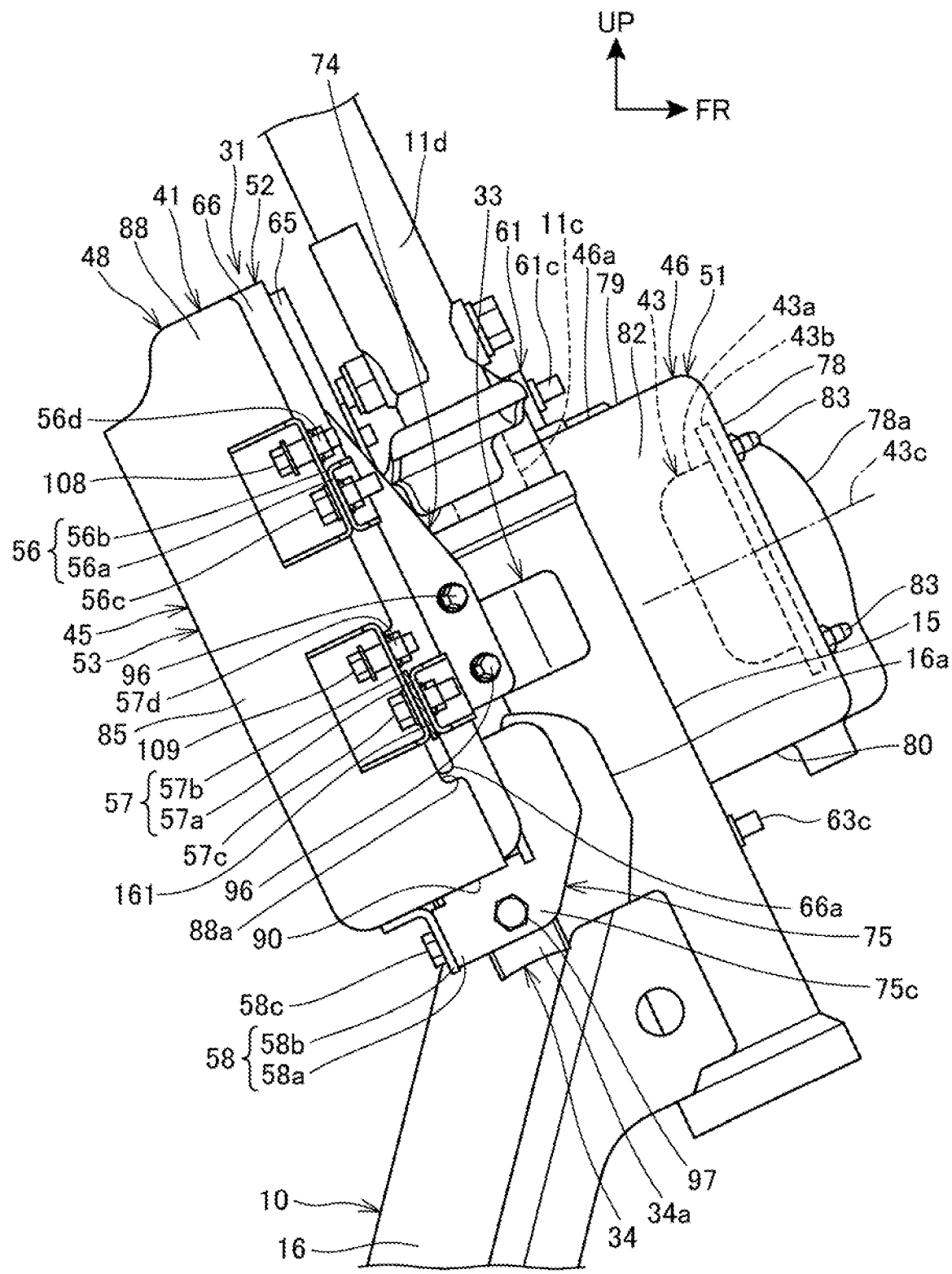
FIG. 6 is a right side view of the airbag unit in a state in which an exterior member is removed.
Figure 7:
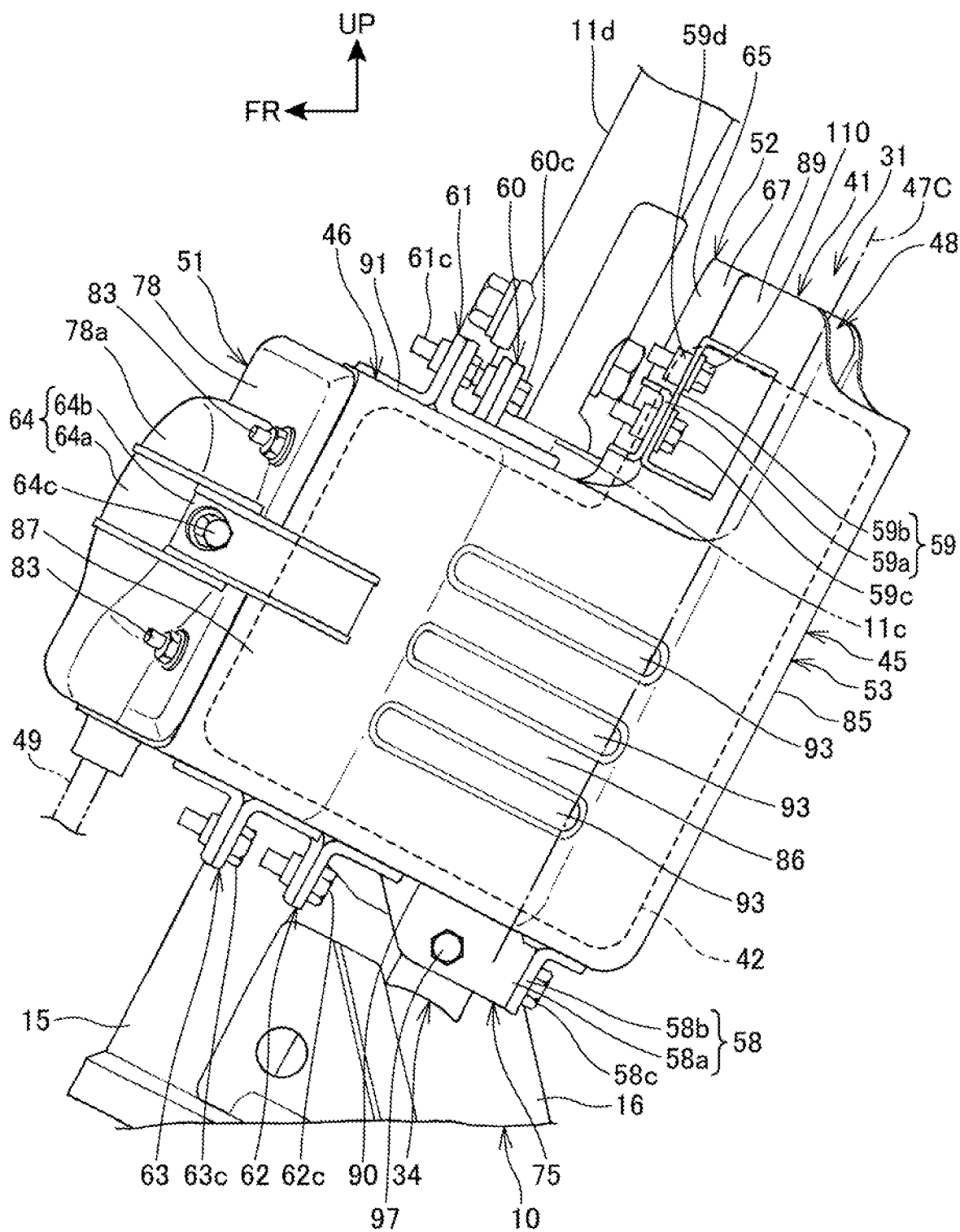
FIG. 7 is a left side view of the airbag unit in a state in which the exterior member is removed.

FIG. 4 is a view of the airbag unit 31 attached to the vehicle body frame 10 as viewed from the rear side. FIG. 5 is a right side view of the airbag unit 31 attached to the vehicle body frame 10. FIG. 6 is a right side view of the airbag unit 31 in a state in which an exterior member 40 is removed. FIG. 7 is a left side view of the airbag unit 31 in a state in which the exterior member 40 is removed.

The airbag unit 31 is disposed behind the head pipe 15 and the handlebar post 11d, and is disposed in such a way as to be inclined rearward along the rear side of the head pipe 15 in the vehicle side view.

The airbag unit 31 is fixed to a stay 32 (see FIG. 2) provided at the front end portion of the vehicle body frame 10.

Referring to FIGS. 2 and 5, the stay 32 includes a first stay 33 provided at an upper portion of the head pipe 15 and a second stay 34 provided at an upper portion of the down frame 16.

The first stay 33 is provided above a connecting portion 16a between the head pipe 15 and an upper end of the down frame 16.

The second stay 34 is disposed below the first stay 33.

Figure 8:
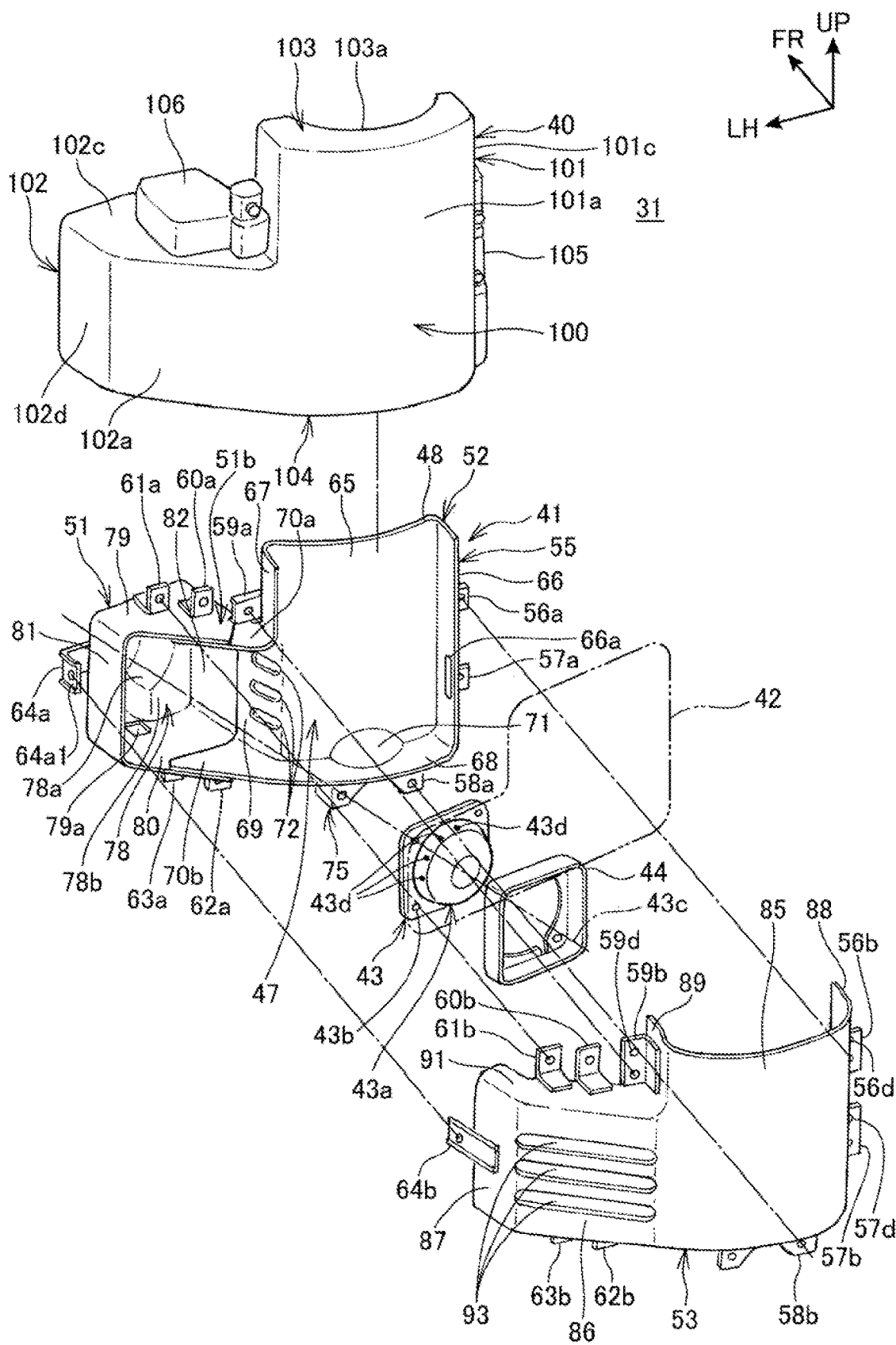
FIG. 8 is an exploded perspective view of the airbag unit.

FIG. 8 is an exploded perspective view of the airbag unit 31.

The airbag unit 31 includes a box-shaped retainer 41 provided in front of the occupant sat on the seat 13 (see FIG. 1), an airbag 42 housed in the retainer 41, an inflator 43 that discharges gas into the airbag 42, a fixing member 44 that fixes the inflator 43 and the airbag 42 to the retainer 41, and the exterior member 40 that covers the retainer 41 from the outer side.

The retainer 41 of the present embodiment is formed in a box shape by assembling a plurality of parts. The retainer 41 is configured by assembling an inflator accommodating portion 51 covering the inflator 43 from the front side, a retainer front half 52 provided behind the head pipe 15, and a retainer rear half 53 provided on the occupant side and joining with the retainer front half 52 and the inflator accommodating portion 51 from the rear side.

The inflator accommodating portion 51 and the retainer front half 52 are coupled and integrated by welding, for example. The inflator accommodating portion 51 and the retainer front half 52 are coupled to form a front case 55 constituting substantially a front half of the retainer 41.

The retainer rear half 53 is a rear case constituting substantially a rear half of the retainer 41.

The retainer 41 is formed by coupling the retainer rear half 53 to the front case 55 from the rear side.

In FIGS. 4 and 8, the retainer 41 is a box-shaped member formed in an inverted L shape when viewed from the occupant side (the rear side of the vehicle). Note that, in the following description, an L shape means an L shape when the retainer 41 is viewed from the front side or the rear side. The retainer 41 has an inverted L shape when viewed from the rear side, but it can be said that the retainer 41 is formed in an L shape.

The retainer 41 is fixed to the front end portion of the vehicle body frame 10 via the stay 32 (see FIG. 2), and is positioned behind the head pipe 15 and the down frame 16.

Referring to FIGS. 4 to 7, the retainer 41 includes a vertically extending portion 45 (see FIG. 7) extending vertically, and a side extending portion 46 (see FIG. 7) extending outward in the vehicle width direction from a lower side of the vertically extending portion 45.

The vertically extending portion 45 is a box-shaped portion extending in the vertical direction along the head pipe 15, and is inclined rearward in the vehicle side view. The vertically extending portion 45 is positioned at the center of the vehicle width and overlaps with upper end portions of the handlebar post 11d, the head pipe 15, and the down frame 16 from the rear side.

The side extending portion 46 is a box-shaped portion extending in the vehicle width direction. The side extending portion 46 passes through the outer side of the head pipe 15 from the side portion of the vertically extending portion 45 and extends outward in the vehicle width direction and forward.

The retainer 41 is formed in an L shape in which the side extending portion 46 extends from the vertically extending portion 45. An L-shaped airbag passage 47 (see FIG. 7) formed by an internal space of the vertically extending portion 45 and an internal space of the side extending portion 46 is formed inside the retainer 41.

An opening 48 (see FIGS. 6 to 8) for exposing the airbag passage 47 upward is formed at an upper portion of the vertically extending portion 45. The airbag 42 is deployed upward from the opening 48.

The inflator 43 is disposed in the side extending portion 46 and is disposed offset outward in the vehicle width direction with respect to the head pipe 15 positioned at the center of the vehicle width.

Figure 9:
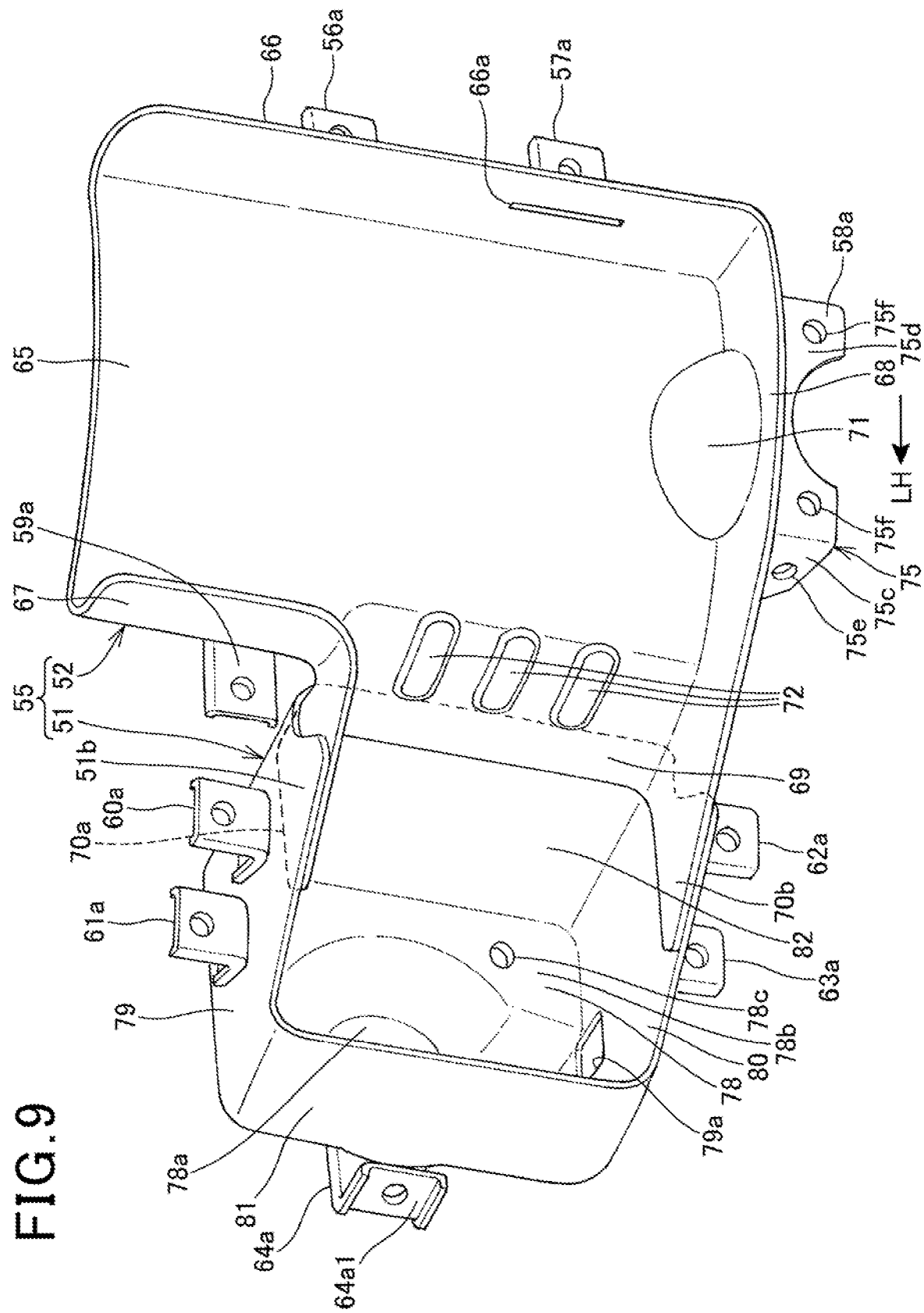
FIG. 9 is an enlarged view of a front case illustrated in FIG. 8.

FIG. 9 is an enlarged view of the front case 55 illustrated in FIG. 8.

Parts of the retainer front half 52 of the retainer 41, the inflator accommodating portion 51, and the retainer rear half 53 of the retainer 41 will be described.

As illustrated in FIGS. 8 and 9, the retainer front half 52 includes a substantially rectangular front wall portion 65 that is vertically long. The front wall portion 65 constitutes a front side surface of the vertically extending portion 45. A lower wall portion 68 extending rearward is formed at a lower edge of the front wall portion 65. A first side wall (side surface) 66 extending rearward is formed at an edge of one of the left and right sides of the front wall portion 65. A second side wall 67 extending rearward is formed at an upper portion of an edge of the other one of the left and right sides of the front wall portion 65.

An extending wall portion 69 extending toward the side extending portion 46 and the front side of the vehicle is formed at a lower portion of the edge of the other one of the left and right sides of the front wall portion 65. The extending wall portion 69 is continuous with a lower portion of the front wall portion 65. An extending portion upper wall 70a extending outward in the vehicle width direction and rearward is formed at an upper edge of the extending wall portion 69. The extending portion upper wall 70a is continuous with a lower end of the second side wall 67. An extending portion lower wall 70b extending outward in the vehicle width direction and rearward is formed at a lower edge of the extending wall portion 69. The extending portion lower wall 70b is continuous with a side portion of the lower wall portion 68.

A recess 71 formed by denting the retainer front half 52 rearward is formed at a lower end portion of the retainer front half 52. The recess 71 is a portion where a lower end portion of the front wall portion 65 and a front portion of the lower wall portion 68 are recessed toward the inside of the retainer 41. The recess 71 is provided at a central portion of the front wall portion 65 in a width direction. A rear portion of an upper end portion of the down frame 16 is positioned in the recess 71. Therefore, a lower end portion of the retainer 41 can be disposed close to the down frame 16, and the retainer 41 can be disposed compactly.

A rib-shaped step portion 72 protruding toward the inside of the retainer 41 is provided on an inner surface of the extending wall portion 69. The step portion 72 is formed to be longer in the left-right direction than in the vertical direction and extends in the left-right direction in the retainer 41. A plurality of step portions 72 are arranged side by side in the vertical direction. The step portion 72 is formed by pushing out a portion of the extending wall portion 69 from the outside to the inside of the retainer 41.

As illustrated in FIG. 5, a fastening portion 73 for fastening the retainer 41 to the stay 32 of the vehicle body frame 10 is provided at a front surface of the front wall portion 65 of the retainer front half 52. The fastening portion 73 includes a first fastening member 74 fastened to the first stay 33 of the head pipe 15 and a second fastening member 75 fastened to the second stay 34 of the down frame 16. The first fastening member 74 is fastened to the first stay 33 by a fixing tool (not illustrated). The second fastening member 75 is fastened to the second stay 34 by a pair of left and right fixing tools 97 (see FIGS. 5 and 6).

As illustrated in FIGS. 6 and 9, a first fixing piece 56a and a second fixing piece 57a extending outward in the vehicle width direction from the first side wall 66 are provided on the first side wall 66 of the retainer front half 52. A slit hole (opening portion) 66a penetrating in a thickness direction and extending in the vertical direction is formed in the first side wall 66. The slit hole 66a is formed on the rear side of the second fixing piece 57a. The slit hole 66a allows the airbag passage 47 to communicate with the inside and the outside of the retainer 41.

As illustrated in FIGS. 8 and 9, the inflator accommodating portion 51 is connected to the retainer front half 52. The inflator accommodating portion 51 is a box-shaped part whose rear portion is opened rearward. The inflator accommodating portion 51 includes a substantially rectangular wall portion 78 covering the inflator 43 from the front side. An upper wall portion 79 extending rearward is formed at an upper edge of the wall portion 78. A lower wall portion 80 extending rearward is formed at a lower edge of the wall portion 78. An outer side wall portion 81 extending rearward is formed at an outer side edge of the wall portion 78 in the vehicle width direction. An inner side wall portion 82 extending rearward is formed on an inner side edge of the wall portion 78 in the vehicle width direction.

The upper wall portion 79 overlaps with the extending portion upper wall 70a of the retainer front half 52 from above, the lower wall portion 80 overlaps with the extending portion lower wall 70b of the retainer front half 52 from below, and the inner side wall portion 82 overlaps with the extending wall portion 69 of the retainer front half 52 from the inner side in the vehicle width direction.

The inflator accommodating portion 51 is welded to the retainer front half 52 by a welded fixing portion 51b (fixing portion) which is a portion where the upper wall portion 79, the lower wall portion 80, and the inner side wall portion 82 overlap with the retainer front half 52 from the outer side.

A main body accommodating portion 78a (see FIG. 7) formed by making a central portion of the wall portion 78 bulge forward is formed in the wall portion 78 of the inflator accommodating portion 51. A receiving surface portion 78b for receiving the inflator 43 is formed around the main body accommodating portion 78a. A plurality of fixing hole portions (not illustrated) penetrating in the thickness direction are formed in the receiving surface portion 78b.

A tubular inflator main body 43a of the inflator 43 that ejects gas is accommodated in the main body accommodating portion 78a. In the inflator 43, a flange portion 43b extending in a radial direction from an outer circumference of a rear portion of the inflator main body 43a abuts on the receiving surface portion 78b. The flange portion 43b is sandwiched between the receiving surface portion 78b and the frame-shaped fixing member 44. The inflator 43 is fastened to an inner surface of the wall portion 78 by a fixing tool 83 (see FIG. 6) inserted into the fixing hole portions (not illustrated) of the fixing member 44, the flange portion 43b, and the receiving surface portion 78b. The wall portion 78 is an inflator support portion that supports the inflator 43.

The inflator 43 is disposed on the inner surface of the wall portion 78 in a direction in which an axis 43c of the tubular inflator main body 43a is directed in the front-rear direction of the vehicle in the vehicle side view. The wall portion 78 to which the flange portion 43b is fixed is slightly inclined rearward with respect to the vertical direction in the vehicle side view. Therefore, the axis 43c extends rearward and downward in the vehicle side view. Here, the inclination of the axis 43c in the vehicle side view is smaller than 45° with respect to the horizontal. Further, the inflator 43 is disposed in a direction in which the axis 43c becomes closer to the center of the vehicle width toward the rear side of the vehicle in plan view viewed from above.

The inflator 43 ejects gas from a plurality of gas ejection ports 43d (see FIG. 8) provided in the outer circumference of the inflator main body 43a behind the flange portion 43b. The frame-shaped fixing member 44 surrounds the gas ejection ports 43d. The gas ejected from the gas ejection ports 43d is guided by an inner surface of the fixing member 44 to flow rearward.

A wire passage hole 79a is provided in the lower wall portion 80 of the inflator accommodating portion 51. A wire 49 (see FIG. 7) connecting the inflator 43 to the airbag control device passes through the wire passage hole 79a.

As illustrated in FIG. 8, the retainer rear half 53 includes a substantially rectangular rear wall portion 85 that is a vertically long plate. The rear wall portion 85 constitutes a rear side surface of the vertically extending portion 45. A side rear wall portion 86 extending outward in the vehicle width direction is formed at a lower-left portion of the rear wall portion 85. The side rear wall portion 86 constitutes a rear side surface of the side extending portion 46. An extending portion side wall 87 extending forward and outward in the vehicle width direction is formed at an edge portion of the outer side of the side rear wall portion 86 in the vehicle width direction.

A first side wall 88 extending forward from a side edge of a side opposite from the side extending portion 46 is formed at a side edge of one of the left and right sides of the rear wall portion 85. The second side wall 89 extending forward from a side edge of a side adjacent to the side extending portion 46 is formed at a side edge of the other one of the left and right sides of the rear wall portion 85. The second side wall 89 is formed at an upper portion of the rear wall portion 85.

Furthermore, the retainer rear half 53 includes a lower wall portion 90 (see FIG. 7) extending forward from a lower edge of the rear wall portion 85, a lower edge of the side rear wall portion 86, and a lower edge of the extending portion side wall 87, and an extending portion upper wall 91 extending forward from an upper edge of the side rear wall portion 86 and an upper edge of the extending portion side wall 87. The extending portion upper wall 91 is continuous with a lower end of the second side wall 89.

The side rear wall portion 86 of the retainer rear half 53 faces a rear surface 43e of the inflator main body 43a. The axis 43c of the inflator main body 43a intersects the side rear wall portion 86 of the retainer 41.

A stepped shape 93 protruding toward the inside of the retainer 41 is provided on an inner surface of the side rear wall portion 86. The stepped shape 93 is formed in a rib shape longer in the left-right direction than in the vertical direction, and extends in the left-right direction in the retainer 41.

A plurality of stepped shapes 93 are arranged side by side in the vertical direction. The plurality of stepped shapes 93 arranged side by side in the vertical direction guide a flow of the gas ejected from the inflator 43 in the vehicle width direction.

The stepped shape 93 is formed by pushing out a portion of the side rear wall portion 86 from the outside to the inside of the retainer 41.

A first fixing piece 56b and a second fixing piece 57b extending outward in the vehicle width direction from the first side wall 88 are provided on the first side wall 88 of the retainer rear half 53.

A notch portion 88a (see FIG. 6) formed by cutting out the front edge rearward in a recessed shape is formed in the first side wall 88 of the retainer rear half 53. The notch portion 88a overlaps with the second fixing piece 57b when viewed from the side (see FIG. 6).

Next, fixing portions 56 to 64 of the front case 55 and the retainer rear half 53 will be described.

The retainer front half 52 of the front case 55 includes the first fixing piece 56a and the second fixing piece 57a extending outward in the vehicle width direction from the first side wall 66. Correspondingly, the retainer rear half 53 includes the first fixing piece 56b and the second fixing piece 57b extending outward in the vehicle width direction from the first side wall 88. The first fixing piece 56a and the first fixing piece 56b constitute a first fixing portion 56 (see FIG. 6). The first fixing piece 56a and the first fixing piece 56b are fastened to each other by a fastener 56c (see FIG. 6) inserted into the first fixing portion 56 from the rear side. The second fixing piece 57a and the second fixing piece 57b constitute a second fixing portion 57 (see FIG. 6). The second fixing piece 57a and the second fixing piece 57b are fastened to each other by a fastener 57c (see FIG. 6) inserted into the second fixing portion 57 from the rear side.

As illustrated in FIG. 8, the retainer front half 52 includes a third fixing piece 58a extending downward from the lower wall portion 68. The third fixing piece 58a is a connecting portion of the second fastening member 75, and is formed integrally with the second fastening member 75. Correspondingly to the third fixing piece 58a, the retainer rear half 53 includes a third fixing piece 58b extending downward from a lower portion of the rear wall portion 85 in the lower wall portion 90. The third fixing piece 58a and the third fixing piece 58b constitute a third fixing portion 58 (see FIG. 6). The third fixing piece 58a and the third fixing piece 58b are fastened to each other by a fastener 58c (see FIG. 6) inserted into the third fixing portion 58 from the rear side.

The retainer front half 52 includes a fourth fixing piece 59a extending outward in the vehicle width direction from the second side wall 67. Correspondingly, the retainer rear half 53 includes a fourth fixing piece 59b extending outward in the vehicle width direction from the second side wall 89. The fourth fixing piece 59a and the fourth fixing piece 59b constitute a fourth fixing portion 59 (see FIG. 7). The fourth fixing piece 59a and the fourth fixing piece 59b are fastened to each other by a fastener 59c inserted into the fourth fixing portion 59 from the rear side.

The inflator accommodating portion 51 of the front case 55 includes a fifth fixing piece 60a and a sixth fixing piece 61a extending upward from the upper wall portion 79. Correspondingly, the retainer rear half 53 includes a fifth fixing piece 60b and a sixth fixing piece 61b extending upward from the extending portion upper wall 91. The fifth fixing piece 60a and the fifth fixing piece 60b constitute a fifth fixing portion 60 (see FIG. 7). The fifth fixing piece 60a and the fifth fixing piece 60b are fastened to each other by a fastener 60c (see FIG. 7) inserted into the fifth fixing portion 60 from the rear side.

The sixth fixing piece 61a and the sixth fixing piece 61b constitute a sixth fixing portion 61 (see FIG. 7). The sixth fixing piece 61a and the sixth fixing piece 61b are fastened to each other by a fastener 61c (see FIG. 7) inserted into the sixth fixing portion 61 from the rear side.

The inflator accommodating portion 51 includes a seventh fixing piece 62a and an eighth fixing piece 63a extending downward from the lower wall portion 80. Correspondingly, the retainer rear half 53 includes a seventh fixing piece 62b and an eighth fixing piece 63b extending downward from a lower portion of the side rear wall portion 86 in the lower wall portion 90. The seventh fixing piece 62a and the seventh fixing piece 62b constitute a seventh fixing portion 62 (see FIG. 7). The seventh fixing piece 62a and the seventh fixing piece 62b are fastened to each other by a fastener 62c (see FIG. 7) inserted into the seventh fixing portion 62 from the rear side. The eighth fixing piece 63a and the eighth fixing piece 63b constitute an eighth fixing portion 63 (see FIG. 7). The eighth fixing piece 63a and the eighth fixing piece 63b are fastened to each other by a fastener 63c inserted into the eighth fixing portion 63 from the rear side.

The inflator accommodating portion 51 includes a ninth fixing piece 64a extending outward in the vehicle width direction from a front surface of the wall portion 78. A distal end portion 64a1 of the ninth fixing piece 64a is bent rearward, and the distal end portion 64a1 is positioned outside the outer side wall portion 81. Corresponding to the ninth fixing piece 64a, the retainer rear half 53 includes a ninth fixing piece 64b extending forward from the extending portion side wall 87. The ninth fixing piece 64a and the ninth fixing piece 64b constitute a ninth fixing portion 64 (see FIG. 7). The ninth fixing piece 64a and the ninth fixing piece 64b are fastened to each other by a fastener 64c (see FIG. 6) inserted into the ninth fixing portion 64 from the outer side.

The retainer 41 can be separated into the front case 55 and the retainer rear half 53 by fastening and unfastening the fixing portions 56 to 64. This contributes to improvement in assemblability of the airbag device 30.

By fastening the fixing portions 56 to 64, the front case 55 and the retainer rear half 53 are fastened to form the retainer 41.

In a state where the fixing portions 56 to 64 are fastened, the retainer rear half 53 overlaps with the front case 55 from the outer side. That is, in a state where the fixing portions 56 to 64 are fastened, the first side wall 88 overlaps with the first side wall 66 from the outer side, the second side wall 89 overlaps with the second side wall 67 from the outer side, the lower wall portion 90 overlaps with the lower wall portion 68, the extending portion lower wall 70b, and the lower wall portion 80 from the outer side, the extending portion upper wall 91 overlaps with the extending portion upper wall 70a and the upper wall portion 79 from the outer side, and the extending portion side wall 87 overlaps with the outer side wall portion 81 from the outer side. At this time, as illustrated in FIG. 6, the slit hole 66a is exposed to the outside in the vehicle width direction by the notch portion 88a of the first side wall 88.

The airbag 42 is housed in the L-shaped airbag passage 47 in the retainer 41 in a folded state, and is provided from the side extending portion 46 to the vertically extending portion 45.

An upstream end of the airbag 42 in the gas flow is sandwiched between the fixing member 44 and the flange portion 43b, whereby the airbag 42 is connected to the inflator 43.

The exterior member 40 is attached to the retainer 41. The exterior member 40 is formed in such a way as to cover substantially the entire surface of the retainer 41 except for a lower surface of the retainer 41. The exterior member 40 includes a cover 100 that covers the retainer 41, and a lid portion 103 (lid) that covers the opening 48 at the upper surface of the retainer 41 from above, the cover 100 and the lid portion 103 being integrated with each other. The cover 100 is provided on a lower side of the lid portion 103. The cover 100 includes a vertically extending portion cover portion 101 that covers the vertically extending portion 45 and a side extending portion cover portion 102 that covers the side extending portion 46, the vertically extending portion cover portion 101 and the side extending portion cover portion 102 being integrated with each other. A lower opening portion 104 that opens a space inside the cover 100 downward is formed in a lower surface of the cover 100. The lower opening portion 104 is provided in the entire lower surface of the exterior member 40. The exterior member 40 is attached to the retainer 41 by covering the retainer 41 from above through the lower opening portion 104.

As illustrated in FIG. 4, in a first side surface portion 101c of an opposite side of the vertically extending portion cover portion 101 from the side extending portion 46, a fixing portion housing portion 105 formed by making a portion of the first side surface portion 101c bulge outward in the vehicle width direction is provided. The first fixing portion 56 and the second fixing portion 57 described above are housed in the fixing portion housing portion 105.

A first attachment hole 105a penetrating through a front surface of the fixing portion housing portion 105 is provided in an upper portion of the front surface of the fixing portion housing portion 105. A cover fastener 108 is inserted into the first attachment hole 105a. The cover fastener 108 is fastened to a first cover fixing hole portion 56d (see FIG. 8) provided in an upper portion of the first fixing piece 56b.

A second attachment hole 105b penetrating through the front surface of the fixing portion housing portion 105 is provided in the front surface of the fixing portion housing portion 105 below the first attachment hole 105a. A cover fastener 109 is inserted into the second attachment hole 105b. The cover fastener 109 is fastened to a second cover fixing hole portion 57d (see FIG. 8) provided in an upper portion of the second fixing piece 57b.

On a side upper surface portion 102c of the side extending portion cover portion 102, a fixing portion housing portion 106 formed by making a portion of the side upper surface portion 102c bulge upward is provided.

The above-described fourth fixing portion 59, fifth fixing portion 60, and sixth fixing portion 61 are housed in the fixing portion housing portion 106. A third attachment hole 106a (see FIG. 4) penetrating through a front surface of the fixing portion housing portion 106 is provided in the front surface. A cover fastener 110 is inserted into the third attachment hole 106a. The cover fastener 110 is fastened to a third cover fixing hole portion 59d (see FIG. 8) provided in an upper portion of the fourth fixing piece 59b.

The exterior member 40 is fastened to the retainer 41 by the cover fasteners 108, 109, and 110. The exterior member 40 of the present embodiment is engaged with a claw portion (not illustrated) provided on the front surface of the retainer 41, and is attached to the retainer 41 in a state where a front portion of the exterior member 40 is prevented from coming off upward.

Referring to FIG. 3, a handlebar holder 11f that supports the handlebar 11e is provided at an upper end portion of the handlebar post 11d. The handlebar holder 11f has a disk shape in plan view viewed from above, and the handlebar 11e is fixed to an upper surface of the handlebar holder 11f.

The airbag unit 31 is disposed in such a way that the lid portion 103 of the exterior member 40 is arranged behind the handlebar holder 11f.

The lid portion 103 of the exterior member 40, a rear surface portion 101a, a side rear surface portion 102a, the fixing portion housing portion 105, and the fixing portion housing portion 106 are exposed to the straddling space 27.

A lid recessed portion 103a recessed downward is provided at a front portion of the lid portion 103 to avoid a rear portion of the handlebar holder 11f. A front edge of the lid recessed portion 103a is formed in an arc shape in accordance with the shape of the rear portion of the handlebar holder 11f.

The rear portion of the handlebar holder 11f is disposed in the lid recessed portion 103a. Therefore, the lid portion 103 can be disposed close to the handlebar holder 11f in the front-rear direction of the vehicle.

As illustrated in FIG. 4, the exterior member 40 includes a tear line 115 and a hinge portion 116 as a cleavage portion broken by the deployed airbag 42.

The tear line 115 and the hinge portion 116 are groove-shaped fragile portions formed to have a plate thickness smaller than a plate thickness of a portion of the exterior member 40 around the tear line 115 and the hinge portion 116.

The tear line 115 is formed to have a plate thickness smaller than that of the hinge portion 116, and cleaves before the hinge portion 116. The hinge portion 116 may cleave, but the exterior member 40 is deformed with the hinge portion 116 as a starting point.

The tear line 115 includes a rear edge 103b of the lid portion 103, left and right side edges 103c of the lid portion 103, and a lid-side tear line 115a provided in a portion excluding a portion of the lid recessed portion 103a in a front edge 103d of the lid portion 103. The tear line 115 includes a pair of left and right rear tear lines 115b extending downward along the left and right side edges of the rear surface portion 101a from portions of the left and right end portions of the rear edge 103b in the lid-side tear line 115a. Furthermore, the tear line 115 includes a pair of left and right front tear lines (not illustrated) extending downward along the left and right side edges of a front surface portion 101b from the left and right end portions of the front edge 103d in the lid-side tear line 115a.

The hinge portion 116 linearly extends in the vehicle width direction between the rear edge 103b and the lid recessed portion 103a on the upper surface of the lid portion 103.

The exterior member 40 covers a range from the upper end portion to the lower end portion of the retainer 41, and covers substantially the entire retainer 41 except for the lower surface and a lower-left portion of the front surface of the retainer 41 from the outer side. Here, the upper end portion of the retainer 41 is the opening 48, and the lower end portion of the retainer 41 is lower edges of the rear wall portion 85 and the side rear wall portion 86.

Therefore, the retainer 41 can be entirely covered from above and surrounded by the exterior member 40, and the waterproofness of the retainer 41 can be improved.

In the airbag device 30 of the present embodiment, the inflator 43 ejects gas into the airbag 42 toward the rear side of the vehicle along the axis 43c under the control of the airbag control device.

The gas discharged from the inflator 43 into the airbag 42 is guided by the side extending portion 46 and the vertically extending portion 45, and flows in an L shape in the airbag passage 47.

At this time, a part of the gas ejected from the inflator 43 hits the stepped shape 93 of the side extending portion 46 via the airbag 42 and flows inward in the vehicle width direction along the stepped shape 93.

When the gas flows from the side extending portion 46 to the vertically extending portion 45, the flow in the left-right direction is changed to the flow in the upward direction, and the gas flows upward in the vertically extending portion 45.

When the airbag 42 inflates upward by the gas flowing upward in the vertically extending portion 45, the exterior member 40 cleaves starting from the portions of the tear line 115 and the hinge portion 116, the lid portion 103 is opened, and the opening 48 is exposed. Then, the airbag 42 is deployed upward from the opening 48 as illustrated in FIG. 1 by the gas flowing upward.

The retainer 41 is fastened to the down frame 16 at a lower side position of the retainer 41 via the second fastening member 75. As a result, the support rigidity of a lower portion of the retainer 41 with respect to the vehicle body frame 10 side is increased, and when the airbag 42 inflates by the gas, a portion of an upper portion of the retainer 41 on the opening 48 side slightly moves toward the occupant side with a portion of the second fastening member 75 as a fulcrum due to the inflation of the airbag 42, and is deformed to widen the opening 48. Therefore, the airbag 42 can be satisfactorily deployed upward.

Figure 10:
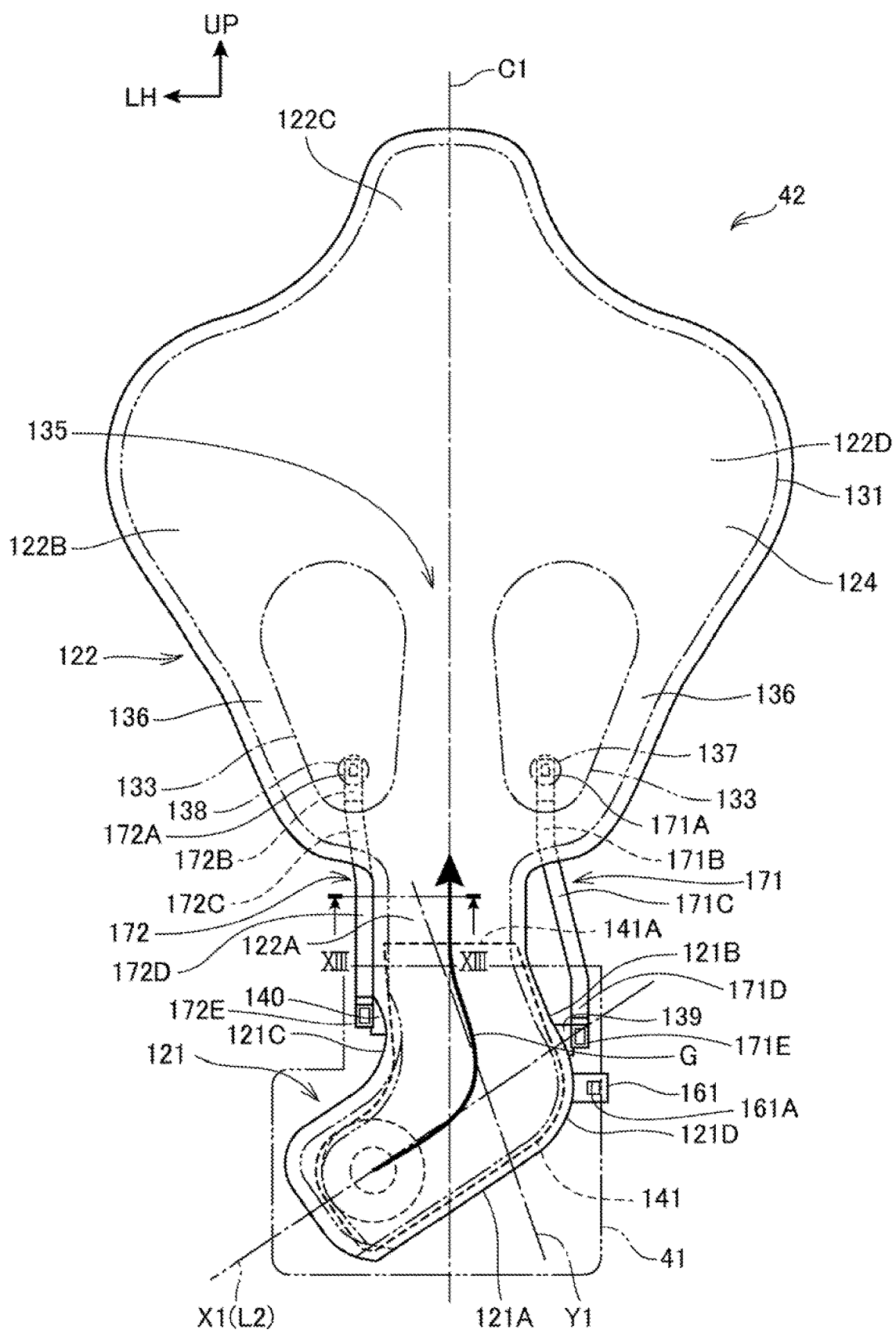
FIG. 10 is a view of the deployed and inflating airbag as viewed from the rear side (corresponding to the occupant side).
Figure 11:
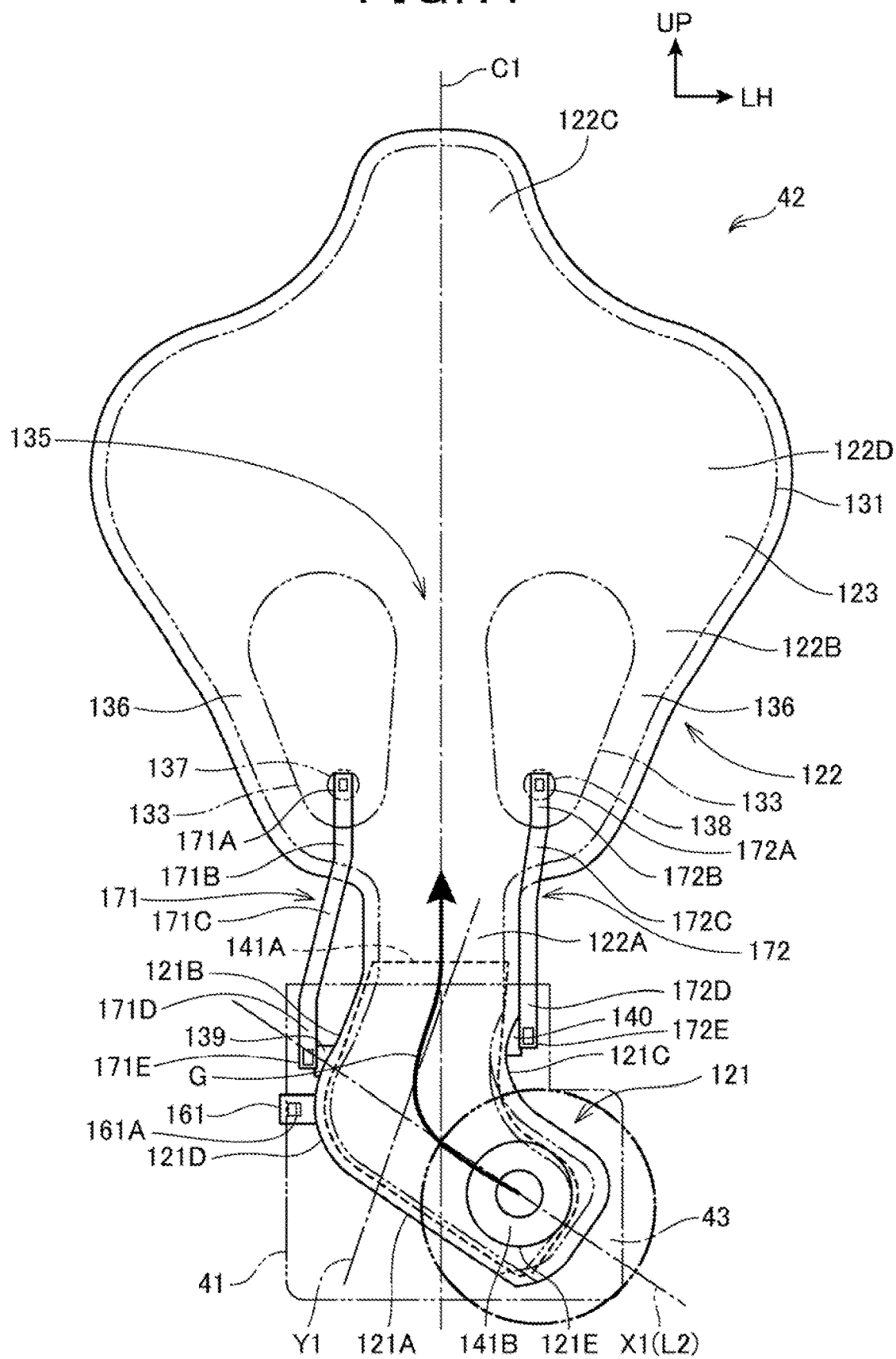
FIG. 11 is a view of the deployed and inflating airbag as viewed from a front side (a side opposite from an occupant).

FIG. 10 is a view of the deployed and inflating airbag 42 as viewed from the rear side (corresponding to the occupant side). FIG. 11 is a view of the deployed and inflating airbag 42 as viewed from the front side (a side opposite from the occupant).

The airbag 42 is a bag including a proximal end portion 121 positioned in the airbag passage 47 (see FIG. 8) of the retainer 41 in a deployed state and an outward deployment portion 122 positioned outside the airbag passage 47 in a deployed state, the proximal end portion 121 and the outward deployment portion 122 being integrated with each other.

The outward deployment portion 122 is formed bilaterally symmetrically with respect to a center line (left-right center line) C1 of the outward deployment portion 122 in the width direction (left-right direction). The airbag 42 is disposed in such a way that the center line C1 is positioned on the left side of the center of the vehicle width. The airbag 42 is disposed in such a way that the center line C1 is at the same position as a center line 47C (see FIGS. 4 and 5) of the vertically extending portion 45 of the retainer 41 in the vehicle width direction.

The outward deployment portion 122 includes a neck portion 122A extending upward from an upper end of the proximal end portion 121, a deployment portion main body 122B extending upward from an upper end of the neck portion 122A, and a bulging portion 122C bulging upward from the center of the upper portion of the deployment portion main body 122B in the width direction.

The neck portion 122A is a cylindrical portion extending in the vertical direction from the opening 48 of the retainer 41 in a state where the airbag 42 is operated and deployed.

The deployment portion main body 122B is formed in a fan shape extending upward and having a width in the left-right direction increasing from a lower end which is a connecting portion with the neck portion 122A. The deployment portion main body 122B includes a head facing portion 122D having the maximum width in the left-right direction at an upper end portion thereof. The head facing portion 122D is a portion assumed to receive the head of the occupant in a state where the airbag 42 is operated and deployed.

The neck portion 122A, the deployment portion main body 122B, and the bulging portion 122C are provided bilaterally symmetrically with respect to the center line C1.

The airbag 42 of the present embodiment is formed in a bag shape by a joining structure of a front base fabric (front surface) 123 (see FIG. 11) and a rear base fabric (rear surface) 124 (see FIG. 10). A sewn portion (coupling portion) 131 for forming the joining structure in which the front base fabric 123 and the rear base fabric 124 are sewn together is formed at peripheral edge portions of the front base fabric 123 and the rear base fabric 124.

The deployment portion main body 122B includes a pair of middle sewn portions 133 and 133 at positions between the neck portion 122A and the head facing portion 122D. The middle sewn portions 133 and 133 are provided bilaterally symmetrically with respect to the center line C1.

The middle sewn portions 133 and 133 are portions where the front base fabric 123 and the rear base fabric 124 of the outward deployment portion 122 are sewn and connected along peripheral edge portions of the middle sewn portions 133 and 133, and the gas G does not pass through the middle sewn portions 133 and 133.

A throttle portion 135 in which the passage of the gas G becomes narrower than that on the upstream side is formed between the left and right middle sewn portions 133 and 133. In addition, throttle portions 136 and 136 in which the passage of the gas G becomes narrower than that on the upstream side are formed between left and right side portions of the outward deployment portion 122 and the middle sewn portions 133 and 133.

Since the passage of the gas G on the upstream side of the head facing portion 122D become narrower by the throttle portion 135, 136, and 136, the gas G is quickly supplied to the head facing portion 122D.

Figure 12:
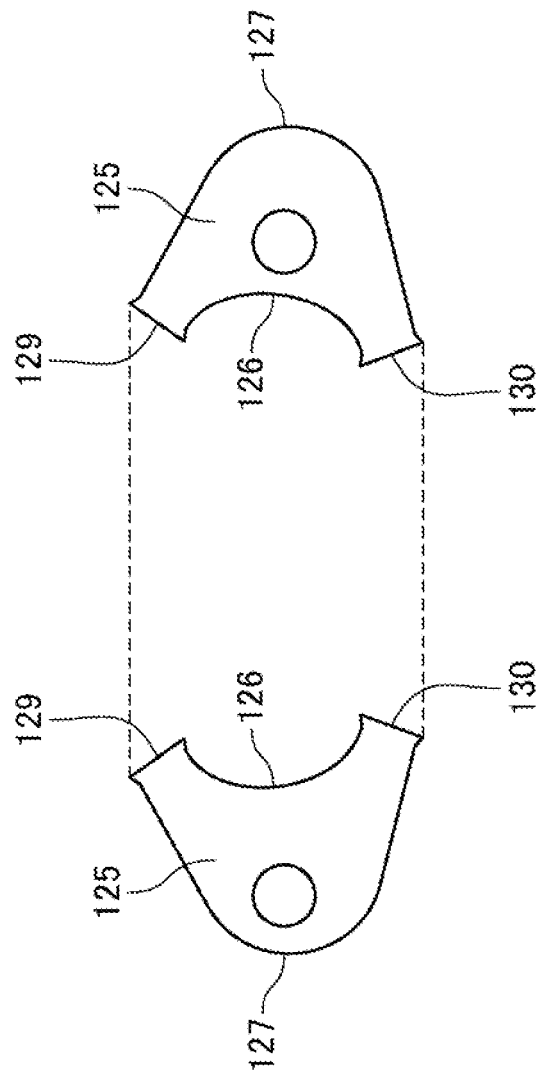
FIG. 12 is an explanatory view of panels forming a circumferential length difference.

FIG. 12 is an explanatory view of panels 125 and 125 forming a circumferential length difference.

The airbag 42 of the present embodiment includes the panels 125 and 125 that are sewn to the sewn portion 131 of the front base fabric 123 and the rear base fabric 124 to form a circumferential length difference between the front base fabric 123 and the rear base fabric 124 when viewed from the side. The panels 125 and 125 are formed of fabric similarly to the front base fabric 123 and the rear base fabric 124. A pair of panels 125 and 125 are provided on the left and right sides of the neck portion 122A. In FIG. 12, the left panel 125 is illustrated in a left side view, and the right panel 125 is illustrated in a right side view. The panels 125 and 125 are configured to be bilaterally symmetrical.

The panels 125 and 125 are substantially D-shaped in a side view. Each of the panels 125 and 125 includes a front edge portion 126 and a rear edge portion 127 facing the front edge portion 126. Each of the panels 125 and 125 includes a first edge portion 129 connecting one end of the front edge portion 126 in a circumferential direction and one end of the rear edge portion 127 in the circumferential direction, and a second edge portion 130 connecting the other end of the front edge portion 126 in the circumferential direction and the other end of the rear edge portion 127 in the circumferential direction. In a side view, the front edge portion 126 and the rear edge portion 127 are formed in an arc shape recessed rearward, and the front edge portion 126 has a shorter circumferential length than the rear edge portion 127. In a side view, the first edge portion 129 and the second edge portion 130 extend substantially linearly, and the circumferential lengths of the first edge portion 129 and the second edge portion 130 are substantially the same.

The peripheral edge portion of the front base fabric 123 and the front edge portion 126 of the panel 125 are sewn while facing each other. The circumferential length of the peripheral edge portion of the front base fabric 123 corresponds to the circumferential length of the front edge portion 126 of the panel 125 in a side view at a portion sewn to the panel 125.

A peripheral edge portion 124C of the rear base fabric 124 and the rear edge portion 127 of the panel 125 are sewn while facing each other. The circumferential length of the peripheral edge portion of the rear base fabric 124 corresponds to the circumferential length of the rear edge portion 127 of the panel 125 in a side view at a portion sewn to the panel 125.

In the neck portion 122A of the outer deployment portion 122, the front base fabric 123 is shorter, and the rear base fabric 124 is longer. Since there is a circumferential length difference between the front base fabric 123 and the rear base fabric 124 in a direction along the center line C1, the airbag 42 is easily deployed in a state of being bent toward a certain front side of the front base fabric 123 in the direction along the center line C1 at the time of deployment.

The neck portion 122A is a cylindrical portion extending in the vertical direction from the opening 48 of the retainer 41, and is positioned below the handlebar 11e in the vehicle side view in a deployed state. Therefore, the panels 125 formed at the neck portion 122A are positioned below the handlebar 11e in the vehicle side view, and the airbag 42 is deployed in this state. Therefore, the airbag 42 is easily deployed upward behind the handlebar 11e through below the handlebar 11e, and the airbag 42 can be deployed while suppressing interference with the handlebar 11e.

In particular, the panel 125 in the present embodiment is disposed upstream of the deployment portion main body 122B including the head facing portion 122D and greatly expanding in the left-right direction, in a flow direction of the gas G. Therefore, it is possible to deploy the airbag 42 while suppressing the deployment portion main body 122B from interfering with portions of the handlebar 11e positioned on the left and right sides of the handlebar post 11d.

As illustrated in FIGS. 10 and 11, in the airbag 42, the proximal end portion 121 connected to the inflator 43 includes a bag left-right extending portion 121A extending in the left-right direction in the side extending portion 46 of the retainer 41 and a bag upward extending portion 121B extending upward from the bag left-right extending portion 121A.

The bag left-right extending portion 121A extends in the left-right direction from the inflator 43 of the retainer 41 toward the center line C1.

The bag upward extending portion 121B extends upward while being slightly inclined with respect to the center line C1 in the vertically extending portion 45. The outward deployment portion 122 extending upward is continuous with an upper end of the bag upward extending portion 121B.

In the proximal end portion 121, the bag left-right extending portion 121A extends toward one side in the vehicle width direction with respect to the center line C1, and is formed to be bilaterally asymmetrical with respect to the center line C1.

That is, in the airbag 42, the outward deployment portion 122 is bilaterally symmetrical with respect to the center line C1, but the proximal end portion 121 is provided bilaterally asymmetrically with respect to the center line C1 along the L-shaped airbag passage 47.

An angle at which an extending direction X1 of the bag left-right extending portion 121A and an extending direction Y1 of the bag upward extending portion 121B intersect is larger than a right angle. The proximal end portion 121 is formed in an L shape along the airbag passage 47 of the retainer 41.

When housed in the retainer 41, the proximal end portion 121 has a shape curved at a substantially right angle along the airbag passage 47.

In the peripheral edge portion of the proximal end portion 121, curved portions 121C and 121D are formed at a connecting portion between the bag left-right extending portion 121A and the bag upward extending portion 121B. The gas G smoothly flows along the curved portions 121C and 121D.

A connecting port 121E (see FIG. 11) connected to the inflator 43 is provided at a position offset from the center line C1 of the bag left-right extending portion 121A in the vehicle width direction in the front base fabric 123 of the proximal end portion 121.

Figure 13:
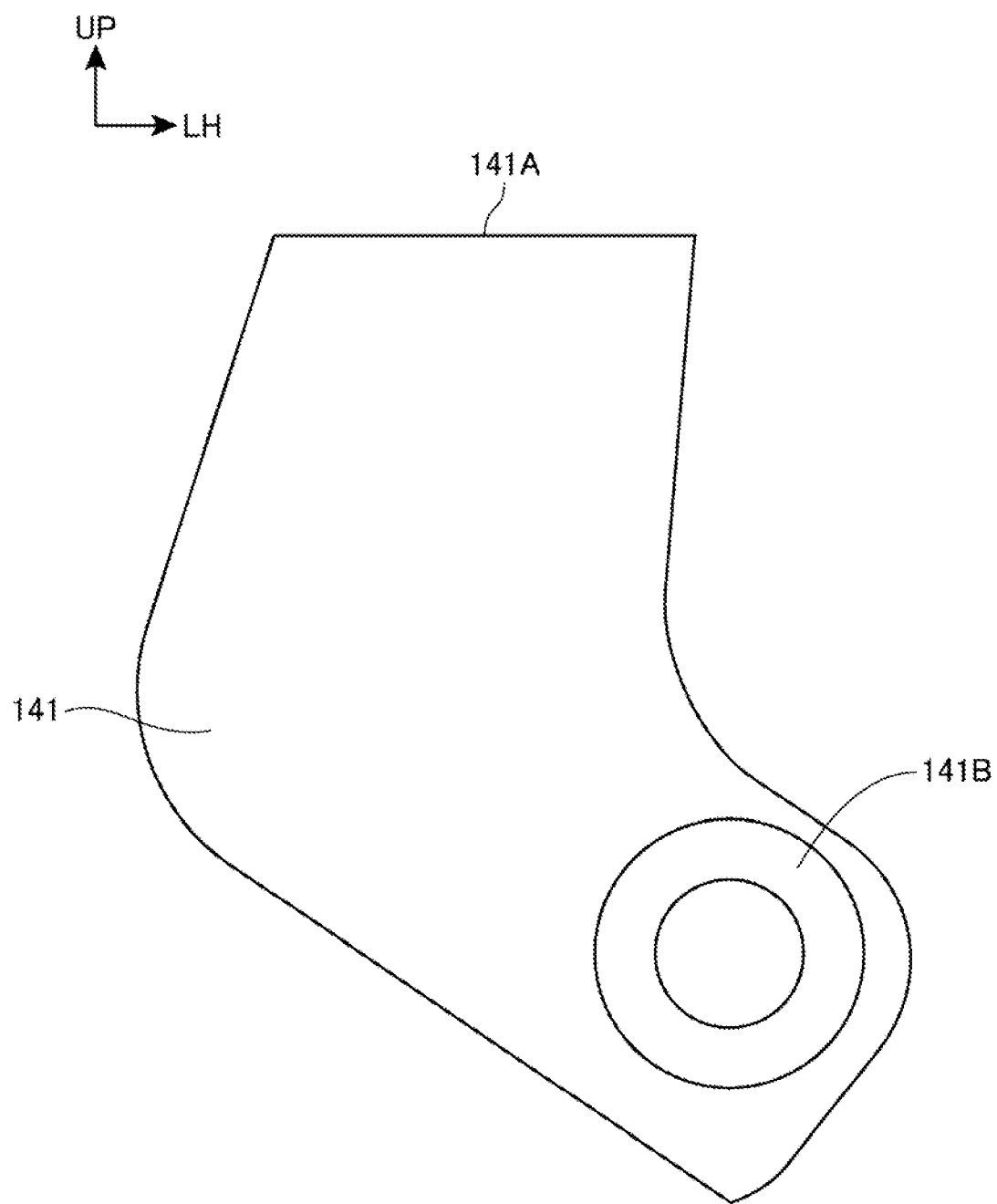
FIG. 13 is a front view of a loop diffuser.

FIG. 13 is a front view of a loop diffuser 141.

The airbag 42 includes the loop diffuser 141 that guides the gas G. The loop diffuser 141 is formed in an L-shaped bag shape including an opening 141A at one end thereof. A peripheral edge portion of the loop diffuser 141 is closed except for the opening 141A.

The loop diffuser 141 is disposed in the gas flow path of the proximal end portion 121 and extends from the inflator 43 to a lower end portion of the outward deployment portion 122. The loop diffuser 141 is coupled to the airbag 42 by being sewn to an inner surface of the proximal end portion 121.

The loop diffuser 141 includes a connecting portion 141B connected to the inflator 43. The connecting portion 141B is connected to the inflator 43 in such a way as to overlap with the connecting port 121E of the bag left-right extending portion 121A from the inner side. The gas G discharged from the inflator 43 directly flows into the bag of the loop diffuser 141 from the connecting portion 141B. The gas G flowing into the loop diffuser 141 flows along the loop diffuser 141 and flows into the outward deployment portion 122 from the opening 141A.

The opening 141A is disposed in such a way that the gas G discharged from the opening 141A flows upward.

Since the flow direction of the gas G from the inflator 43 can be controlled by the loop diffuser 141, a filling procedure for filling the airbag 42 with the gas G can be controlled, and the airbag 42 can be efficiently deployed upward.

Further, in the proximal end portion 121, the strength of the airbag 42 is secured by the loop diffuser 141. The proximal end portion 121 is a portion that receives the gas G immediately after the injection from the inflator 43, but since the strength of the proximal end portion 121 is secured, the shape of the proximal end portion 121 is easily stabilized, and the airbag 42 can be efficiently deployed in a state where the posture is stabilized.

As illustrated in FIGS. 10 and 11, a right pipe portion 137 is formed at a lower portion of an inner peripheral side of the right middle sewn portion 133. A left pipe portion 138 is formed at a lower portion of an inner peripheral side of the left middle sewn portion 133. The pipe portions 137 and 138 sew the front base fabric 123 and the rear base fabric 124 in a circular shape.

A right side tab 139 and a left side tab 140 are provided on the proximal end portion 121. The side tabs 139 and 140 are fabrics separate from the front base fabric 123 and the rear base fabric 124. The side tabs 139 and 140 are disposed between the front base fabric 123 and the rear base fabric 124 and are sewn to the sewn portion 131.

The right side tab 139 is sewn in a state of extending toward one side in the left-right direction from the right curved portion 121D of the proximal end portion 121. The right side tab 139 overlaps with a line L2 passing through the center of the inflator 43 and extending along the longitudinal direction X1 of the bag left-right extending portion 121A in a vehicle front view.

The left side tab 140 is sewn in a state of extending toward the other side in the left-right direction from the left curved portion 121C of the proximal end portion 121. The left side tab 140 is disposed above the right side tab 139 in the vehicle front view.

Anchoring bodies 171 and 172 are disposed between the pipe portions 137 and 138 and the side tabs 139 and 140. The anchoring bodies 171 and 172 are formed of a belt-shaped fabric extending in the vertical direction.

The right anchoring body 171 includes an upper end 171A sewn to an inner side of the right pipe portion 137, an upper straight portion 171B linearly extending downward from the upper end 171A, an inclined portion 171C extending downward from the upper straight portion 171B and becoming away from the center line C1 toward the lower side, a lower straight portion 171D linearly extending downward from the inclined portion 171C, and a lower end portion 171E formed at a lower end of the lower straight portion 171D and sewn to a front surface of the right side tab 139. In the right anchoring body 171, a lower portion of the inclined portion 171C extends into the retainer 41, and an upper portion of the inclined portion 171C overlaps with the outward deployment portion 122 in a deployed state.

The left anchoring body 172 includes an upper end 172A sewn to an inner side of the left pipe portion 138, an upper straight portion 172B linearly extending downward from the upper end 172A, an inclined portion 172C extending downward from the upper straight portion 172B and approaching the center line C1 toward the lower side, a lower straight portion 172D linearly extending downward from the inclined portion 172C, and a lower end portion 172E formed at a lower end of the lower straight portion 172D and sewn to a front surface of the left side tab 140. In the left anchoring body 172, the lower straight portion 172D extends along a left side portion of the neck portion 122A, and the inclined portion 172C substantially entirely overlaps with the outward deployment portion 122 in a deployed state.

The proximal end portion 121 and the outward deployment portion 122 are connected by the anchoring body 171 on the right side with respect to the center line C1 and are connected by the anchoring body 172 on the left side. Here, the inflator 43 is disposed on the left side of the center line C1, and a force tilting to the left or right is likely to act on the proximal end portion 121 by the gas G moving upward from the left and right direction. On the other hand, in the present embodiment, the anchoring bodies 171 and 172 are connected, and distances between the pipe portions 137 and 138 and the side tabs 139 and 140 are restricted from excessively increasing on the right side and the left side with respect to the center line C1. As a result, it is possible to deploy the airbag 42 while suppressing the airbag 42 from being inclined in the front-rear direction.

A fixing tab (tab) 161 is provided below the side tabs 139 and 140. The fixing tab 161 is a fabric separate from the front base fabric 123 and the rear base fabric 124. The fixing tab 161 is sewn to the sewn portion 131 while being sandwiched between the front base fabric 123 and the rear base fabric 124. A fixing hole 161A penetrating in the thickness direction is formed in the fixing tab 161.

The fixing tab 161 is provided on a side opposite from the inflator 43 in the longitudinal direction X1 of the bag left-right extending portion 121A. The fixing tab 161 of the present embodiment extends rightward, that is, toward the side opposite from the inflator 43, from the curved portion 121D bulging toward the side opposite from the inflator 43. The fixing tab 161 is provided below the line L2 passing through the center of the inflator 43 and extending along the bag left-right extending portion 121A in the front view.

When the airbag 42 is housed in the front case 55, the fixing tab 161 is led out to the outside through the slit hole 66a. When the front case 55 and the retainer rear half 53 are assembled, the fixing tab 161 is sandwiched between the second fixing piece 57a of the front case 55 and the second fixing piece 57b of the retainer rear half 53. Then, the fastener 57c is inserted through the second fixing piece 57a of the front case 55, the second fixing piece 57b of the retainer rear half 53, and the fixing hole 161A of the fixing tab 161, and the fixing tab 161 is fastened together to the second fixing pieces 57a and 57b. That is, the fixing tab 161 is fixed to the component of the retainer 41 outside the retainer 41.

In the present embodiment, the fixing tab 161 is led out to the outside of the retainer 41 through the slit hole 66a. However, for example, the slit hole 66a may be omitted, a fixing portion may be provided in the airbag passage 47 of the first side wall 66, and the fixing tab 161 may be fixed to the fixing portion.

Next, the operation of the present embodiment will be described.

Once the inflator 43 of the airbag device 30 operates, the gas G is injected into the airbag 42. The airbag 42 inflates by a pressure of the gas G and deployed upward.

That is, when the inflator 43 operates, the gas G is injected to the loop diffuser 141. The gas G is guided by the loop diffuser 141 to move through the L-shaped proximal end portion 121. The gas G having passed through the proximal end portion 121 enters the outward deployment portion 122 to deploy the outward deployment portion 122.

At this time, the exterior member 40 of the airbag device 30 is broken, and the outward deployment portion 122 is deployed from the opening 48. In the present embodiment, the second fastening member 75 increases the support rigidity of the lower portion of the retainer 41, and when the airbag 42 inflates, the portion of the upper portion of the retainer 41 on the opening 48 side slightly moves toward the occupant side with the portion of the second fastening member 75 as a fulcrum, and is deformed to widen the opening 48. Therefore, the outward deployment portion 122 of the airbag 42 is easily deployed rearward immediately after the inflation.

Once the outward deployment portion 122 is deployed rearward, the neck portion 122A is positioned directly below the handlebar 11e in the vehicle side view as illustrated in FIG. 1. The panels 125 and 125 are sewn to the neck portion 122A, and a circumferential length difference is generated between the front base fabric 123 and the rear base fabric 124 in such a way that the front base fabric 123 is shorter. Therefore, the airbag 42 that pops out rearward from the retainer 41 is easily bent toward the front base fabric 123 and deployed upward after passing below the handlebar 11e.

In the present embodiment, it is easy to deploy the airbag 42 while suppressing the airbag 42 from coming into contact with the handlebar 11e.

In the proximal end portion 121 of the airbag 42, the fixing tab 161 is provided on the side opposite from the inflator 43 in the longitudinal direction X1 of the bag left-right extending portion 121A, and the fixing tab 161 is fixed to the retainer 41. The gas G injected from the inflator 43 moves along the longitudinal direction X1 of the bag left-right extending portion 121A, and then moves upward along the bag upward extending portion 121B. For this reason, there is a possibility that the airbag 42 loses its balance in the left-right direction due to a force of moving upward from the gas G at the proximal end portion 121. On the other hand, in the present embodiment, since the fixing tab 161 is fixed to the retainer 41, it is easy to ensure the balance of the airbag 42, and it is easy to deploy the airbag 42 while suppressing the airbag 42 from being inclined in the left-right direction.

In particular, the fixing tab 161 is provided below the line L2 passing through the center of the inflator 43 in the front view. Therefore, the airbag 42 can be fixed at the base side of the airbag 42 by the connecting portion 141B with the inflator 43 and the fixing tab 161, and the airbag 42 can be deployed while suppressing the airbag 42 from being inclined in the left-right direction.

In the present embodiment, since the proximal end portion 121 and the outward deployment portion 122 are connected by the pair of left and right anchoring bodies 171 and 172, the outward deployment portion 122 and the proximal end portion 121 are deployed while being restricted from excessively increasing in distance therebetween. Therefore, the airbag 42 is deployed while the airbag 42 is suppressing from being inclined in the front-rear direction.

As described above, in the present embodiment, the airbag 42 is efficiently deployed while being suppressed from coming into contact with the handlebar 11e (see FIG. 1.)

As described above, according to the embodiment to which the present invention is applied, the saddle riding-type vehicle includes: the retainer 41 that is provided behind the head pipe 15; the inflator 43; and the airbag 42 that is housed in the retainer 41, inflates by the gas G discharged by the inflator 43, and is deployed in front of an occupant, in which the retainer 41 is disposed below the handlebar 11e, the airbag 42 is formed in a bag shape by the joining structure of the front base fabric 123 and the rear base fabric 124, and the panels 125 that form a circumferential length difference between the front base fabric 123 and the rear base fabric 124 in the side view are provided at the coupling portion 131 between the front base fabric 123 and the rear base fabric 124. Therefore, it is possible to deploy the airbag 42 while suppressing interference with the handlebar 11e.

In the present embodiment, the panels 125 are positioned below the handlebar 11e when the airbag 42 is deployed. Therefore, the airbag 42 can have a circumferential length difference below the handlebar 11e, and the airbag 42 can be bent and deployed below the handlebar 11e, so that the airbag 42 can be made less likely to interfere with the handlebar 11e.

In the present embodiment, the airbag 42 includes the proximal end portion 121 positioned in the retainer 41 when the airbag 42 is deployed, the neck portion 122A extending upward from the upper end of the proximal end portion 121 and deployed to the outside of the retainer 41 when the airbag 42 is deployed, and the deployment portion main body 122B extending upward and having a width in the left-right direction increasing from the upper end of the neck portion 122A, and the panels 125 may be provided at the neck portion 122A. Therefore, the deployment portion main body 122B greatly expanding in the left-right direction can easily avoid the handlebar 11e.

The neck portion 122A includes the side tabs 139 and 140, and the anchoring bodies 171 and 172 extending from the deployment portion main body 122B are connected to the side tabs 139 and 140. Therefore, it is possible to deploy the airbag 42 while suppressing the airbag 42 from being inclined in the front-rear direction.

According to the embodiment to which the present invention is applied, the saddle riding-type vehicle includes: the retainer 41 that is provided behind the head pipe 15; the inflator 43; and the airbag 42 that is housed in the retainer 41, inflates by the gas G discharged by the inflator 43, and is deployed in front of the occupant, in which the airbag 42 includes the proximal end portion 121 that is positioned in the retainer 41 when the airbag 42 is deployed, and the outward deployment portion 122 that extends from the proximal end portion 121 and is deployed to the outside of the retainer 41 when the airbag 42 is deployed, a fixing tab 161 is provided on the proximal end portion 121, and the fixing tab 161 is fixed to the retainer 41. Therefore, it is possible to deploy the airbag 42 while suppressing the airbag 42 from being inclined in the left-right side.

In the present embodiment, the slit hole 66a into which the fixing tab 161 is inserted is formed in the first side wall 66 constituting the side surface of the retainer 41, and the fixing tab 161 is fixed to an outer side of the retainer 41 through the slit hole 66a. Therefore, the fixing portion of the fixing tab 161 can be hardly affected by the gas G injected from the inflator 43.

In the above configuration, the proximal end portion 121 includes the bag left-right extending portion 121A connected to the inflator 43 and the bag upward extending portion 121B extending upward from the bag left-right extending portion 121A, and the fixing tab 161 is provided on a side opposite from the inflator 43 in the longitudinal direction X1 of the bag left-right extending portion 121A. Therefore, it is possible to fix, to the retainer 41, a portion of the airbag 42 that is hardly affected by the gas G injected from the inflator 43, and it is possible to suppress the airbag from being inclined in the left-right direction.

In the present embodiment, the fixing tab 161 is provided below the line L2 passing through the center of the inflator 43 and extending along the bag left-right extending portion 121A in a front view. Accordingly, since the fixing tab 161 is positioned below the line L2, the airbag 42 can be fixed at the base side together with the connecting portion 141B with the inflator 43, and it is possible to deploy the airbag 42 deployed while suppressing the airbag 42 from being inclined in the left-right direction.

In the present embodiment, the loop diffuser 141 that guides the gas G is provided in the inflator 43, and the loop diffuser 141 is disposed in the gas flow path of the proximal end portion 121. Therefore, it is possible to reinforce the proximal end portion 121, and it is possible to deploy the airbag 42 while stabilizing the posture of the proximal end portion 121.

The above embodiment illustrates one aspect to which the present invention is applied, and the present invention is not limited to the above embodiment.

In the above embodiment, a configuration in which one fixing tab 161 and one slit hole 66a are provided has been described, but the number of fixing tabs 161 and the number of slit holes 66a are not limited to one, and a plurality of fixing tabs 161 and slit holes 66a may be provided.

Further, in the above embodiment, a configuration in which the anchoring bodies 171 and 172 are provided has been described, but the anchoring body 172 may be omitted.

In addition, in the above embodiment, the motorcycle 1 has been described as an example of the saddle riding-type vehicle. The present invention, however, is not limited thereto, and thus the present invention is applicable to a three-wheeled saddle riding-type vehicle having two front wheels or two rear wheels, and a saddle riding-type vehicle having four or more wheels.

REFERENCE SIGNS LIST

1 Motorcycle (saddle riding-type vehicle)
15 Head pipe
41 Retainer
42 Airbag
43 Inflator
66 First side wall (side surface)
66a Slit hole (opening portion)
121 Proximal end portion
121A Bag left-right extending portion
121B Bag upward extending portion
122 Outward deployment portion
141 Loop diffuser
161 Fixing tab (tab)
G Gas
L2 Line passing through center of inflator
X1 Longitudinal direction

The invention claimed is:

1. A saddle riding-type vehicle comprising: a retainer that is provided behind a head pipe; an inflator; and an airbag that is housed in the retainer, inflates by gas discharged by the inflator, and is deployed in front of an occupant,
   wherein the retainer is formed in a L shape having a vertically extending portion extending in a vertical direction of a vehicle body and a side extending portion extending outward in a vehicle width direction from a lower portion of the vertically extending portion,
   the inflator is disposed inside the side extending portion,
   a L-shaped airbag passage formed by an internal space of the vertically extending portion and an internal space of the side extending portion is formed inside the retainer,
   when the airbag is deployed, the airbag includes a proximal end portion that is positioned in the retainer and an outward deployment portion that extends from the proximal end portion and is deployed to an outside of the retainer,
   the proximal end portion includes a bag left-right extending portion connected to the inflator and a bag upward extending portion extending upward from the bag left-right extending portion,
   a tab is provided on a side opposite from the inflator in a longitudinal direction of the bag left-right extending portion,
   a curved portion bulging toward a side opposite from the inflator in the longitudinal direction of the bag left-right extending portion is formed at a connection portion of the bag left-right extending portion and the bag upward extending portion of the airbag,
   the tab extends from the curved portion toward the side opposite from the inflator, and
   the tab is fixed to the retainer.

2. The saddle riding-type vehicle according to claim 1, wherein
   an opening into which the tab is inserted is formed in a side surface of the retainer, and
   the tab is fixed to an outer side of the retainer through the opening.

3. The saddle riding-type vehicle according to claim 1, wherein the tab is provided below a line passing through a center of the inflator and extending along the bag left-right extending portion in a front view.

4. The saddle riding-type vehicle according to claim 1, wherein a loop diffuser that guides the gas is provided in the inflator, and
   the loop diffuser is disposed in a gas flow path of the proximal end portion.

5. The saddle riding-type vehicle according to claim 2, wherein the tab is provided below a line passing through a center of the inflator and extending along the bag left-right extending portion in a front view.

6. The saddle riding-type vehicle according to claim 2, wherein a loop diffuser that guides the gas is provided in the inflator, and
   the loop diffuser is disposed in a gas flow path of the proximal end portion.

7. The saddle riding-type vehicle according to claim 3, wherein a loop diffuser that guides the gas is provided in the inflator, and
   the loop diffuser is disposed in a gas flow path of the proximal end portion.

8. The saddle riding-type vehicle according to claim 5, wherein a loop diffuser that guides the gas is provided in the inflator, and
   the loop diffuser is disposed in a gas flow path of the proximal end portion.

* * * * *